US012641643B2

(12) United States Patent　(10) Patent No.:　US 12,641,643 B2
　　Fouad et al.　(45) Date of Patent:　May 26, 2026

(54) Rx UE(S) ASSISTED CHANNEL ACCESS PROCEDURE FOR SIDELINK OPERATION IN UNLICENSED BAND

(71) Applicant: Samsung Electronics Co., Ltd., Suwon-si (KR)

(72) Inventors: Yaser Mohamed Mostafa Kamal Fouad, San Diego, CA (US); Philippe Jean Marc Michel Sartori, Naperville, IL (US); Liang Hu, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 281 days.

(21) Appl. No.: 18/197,715

(22) Filed: May 15, 2023

(65) Prior Publication Data

US 2023/0403740 A1　Dec. 14, 2023

Related U.S. Application Data

(60) Provisional application No. 63/350,401, filed on Jun. 8, 2022.

(51) Int. Cl.
　　*H04W 74/0816*　(2024.01)
　　*H04W 74/08*　(2024.01)

(52) U.S. Cl.
　　CPC ...　*H04W 74/0816* (2013.01); *H04W 74/0866* (2013.01)

(58) Field of Classification Search
　　CPC ..................... H04W 74/0816; H04W 74/0886
　　See application file for complete search history.

(56) References Cited

U.S. PATENT DOCUMENTS

| | | |
|---|---|---|
| 11,483,864 B2 | 10/2022 | Xue et al. |
| 12,336,002 B2 | 6/2025 | Hu et al. |
| 2018/0132236 A1* | 5/2018 | Kadous ................. H04L 1/0002 |

(Continued)

FOREIGN PATENT DOCUMENTS

WO　　2022061754 A1　3/2022

OTHER PUBLICATIONS

3GPP, 3GPP TR 37.985 V16.1.0 (Mar. 2022) Technical Report, "3rd Generation Partnership Project; Technical Specification Group Radio Access Network; Overall description of Radio Access Network (RAN) aspects for Vehicle-to-everything (V2X) based on LTE and NR (Release 16)," Mar. 2022, 36 pages.

(Continued)

*Primary Examiner* — James P Duffy
(74) *Attorney, Agent, or Firm* — Renaissance IP Law Group LLP

(57)　　ABSTRACT

A system and a method are disclosed for determining, by a targeted receiving User Equipment (UE), that a corresponding transmitting UE has a future reserved resource block. The receiving UE may perform a Listen Before Talk (LBT) sensing to identify a time period when an unlicensed channel is unoccupied and can be used by the corresponding transmitting UE for the future reserved sidelink transmission. The receiving UE may transmit a reservation signal for the unlicensed channel to the corresponding transmitting UE, during at least a portion of the time period when the unlicensed channel is unoccupied. Further, the receiving UE may, switch, to a receiving mode prior to or at a reserved slot boundary of the future reserved resource block.

20 Claims, 32 Drawing Sheets

(56)  References Cited

U.S. PATENT DOCUMENTS

| 2018/0288787 | A1* | 10/2018 | Hooli | H04L 5/0053 |
| 2021/0136783 | A1* | 5/2021 | Fakoorian | H04W 76/14 |
| 2022/0095301 | A1 | 3/2022 | Oviedo et al. | |
| 2022/0167402 | A1 | 5/2022 | Liu et al. | |
| 2022/0167407 | A1 | 5/2022 | Oviedo et al. | |
| 2022/0183035 | A1* | 6/2022 | Matsumura | H04W 72/0446 |
| 2022/0217771 | A1 | 7/2022 | Liu et al. | |
| 2022/0377790 | A1* | 11/2022 | Awadin | H04W 74/006 |
| 2023/0087110 | A1 | 3/2023 | Hu et al. | |
| 2023/0106442 | A1 | 4/2023 | Hu et al. | |

OTHER PUBLICATIONS

3GPP, 3GPP TS 37.213 V16.12.0 (Mar. 2023), Technical Specification, "3rd Generation Partnership Project; Technical Specification Group Radio Access Network; Physical layer procedures for shared spectrum channel access (Release 16)," Mar. 2023, 28 pages.
3GPP, 3GPP TSG RAN Meeting #86, LG Electronics, RP-193231, "New WID on NR sidelink enhancement," Agenda Item 9.1.1, Dec. 2019, 6 pages.

* cited by examiner

UE A

UE B

UE C (Hidden
node to UE A)

UE A          UE B          UE C          UE D

1700

LBT sensing by Rx UE

Reservation signal

Control signaling indication (2C sequence sent on a specific RB)

Slot X-1 used by Rx UE

Slot x used by Tx UE

Rx UE(S) ASSISTED CHANNEL ACCESS PROCEDURE FOR SIDELINK OPERATION IN UNLICENSED BAND

CROSS-REFERENCE TO RELATED APPLICATION

This application claims the priority benefit under 35 U.S.C. § 119(e) of U.S. Provisional Application No. 63/350,401, filed on Jun. 8, 2022, the disclosure of which is incorporated by reference in its entirety as when fully set forth herein.

TECHNICAL FIELD

This disclosure generally relates to communication systems. More particularly, the subject matter disclosed herein relates to improvements to New Radio (NR) sidelink operations.

BACKGROUND

A wireless communication system may implement a listen-before-talk (LBT) procedure in which an apparatus that intends to transmit on a communication channel may first listen for transmissions from other apparatus to avoid collisions on the channel. An LBT procedure may be used, for example, in unlicensed spectrum where there may be no centralized control of transmissions from different systems.

The above information disclosed in this Background section is only for enhancement of understanding of the background of the invention and therefore it may contain information that does not constitute prior art.

SUMMARY

A method may include determining, by a targeted receiving User Equipment (UE), that a corresponding transmitting UE has a future reserved resource block, performing, by the targeted receiving UE, a Listen Before Talk (LBT) sensing to identify a time period when an unlicensed channel is unoccupied, and can be used by the corresponding transmitting UE for the future reserved sidelink transmission. The method may include transmitting a reservation signal for the unlicensed channel to the corresponding transmitting UE, during at least a portion of the time period when the unlicensed channel is unoccupied, and prior or at a reserved slot boundary of the future reserved resource block, switching, by the receiving UE, to a receiving mode. The reservation signal may include a set of control information with a Channel Occupancy Time (COT) sharing indication. The method may also include the multiple UE's being synchronized to a synchronization reference UE where each of the synchronized UEs perform Listen Before Talk sensing and reserve the channel on behalf of the synchronization reference UE. The method may also include performing a sidelink transmission, by the corresponding transmitting UE, at the reserved slot boundary over the reserved resource block. In some embodiments, the method may include a reservation signal with a duty cycle of less than 100%. Other technical features may be readily apparent to one skilled in the art from the following figures, descriptions, and claims.

A method may include receiving, a reservation signal on a transmitting User Equipment (UE), transmitted by a receiving UE on an unlicensed channel, and decoding the reservation signal, by the transmitting UE, where the reservation signal was transmitted for the unlicensed channel to the transmitting UE, by the receiving UE, during at least a portion of a time period when the unlicensed channel is unoccupied, and where the receiving UE performed a Listen Before Talk sensing to identify the time period when the unlicensed channel was unoccupied. A portion or the whole reservation signal may carry the set of control information, in some embodiments. The reservation signal may have control information in a subset of the reserved channel based on a resource pool (pre)-configuration. The set of control information may be carried in a Demodulation Reference Signal (DMRS) sequence. The set of control information may be carried by one or more Zadoff-Chu (ZC) sequences. The reservation signal may have the set of control information in all reserved subchannels, in some embodiments. A portion or the whole reservation signal may carry the set of control information. The reservation signal may have control information in a subset of the reserved channel based on a resource pool (pre)-configuration. The set of control information may be carried in a Demodulation Reference Signal (DMRS) sequence. The set of control information may be carried by one or more Zadoff-Chu (ZC) sequences. The reservation signal may have the set of control information in all reserved subchannels. Other technical features may be readily apparent to one skilled in the art from the following figures, descriptions, and claims.

A device may include a transceiver and a processor. The processor may be configured to determine, via the transceiver, that a corresponding transmitting User Equipment (UE) has a future reserved resource block, and perform, via the transceiver, a Listen Before Talk (LBT) sensing to identify a time period when an unlicensed channel is unoccupied, and can be used by the corresponding device for the future reserved sidelink transmission. The processor may be further configured to transmit a reservation signal for the unlicensed channel to the corresponding transmitting UE, during at least a portion of the time period when the unlicensed channel is unoccupied, and prior or at a reserved slot boundary of the future reserved resource block, switch, by the device, to a receiving mode. In the device, the reservation signal may include a set of control information with a Channel Occupancy Time (COT) sharing indication. Other technical features may be readily apparent to one skilled in the art from the following figures, descriptions, and claims.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
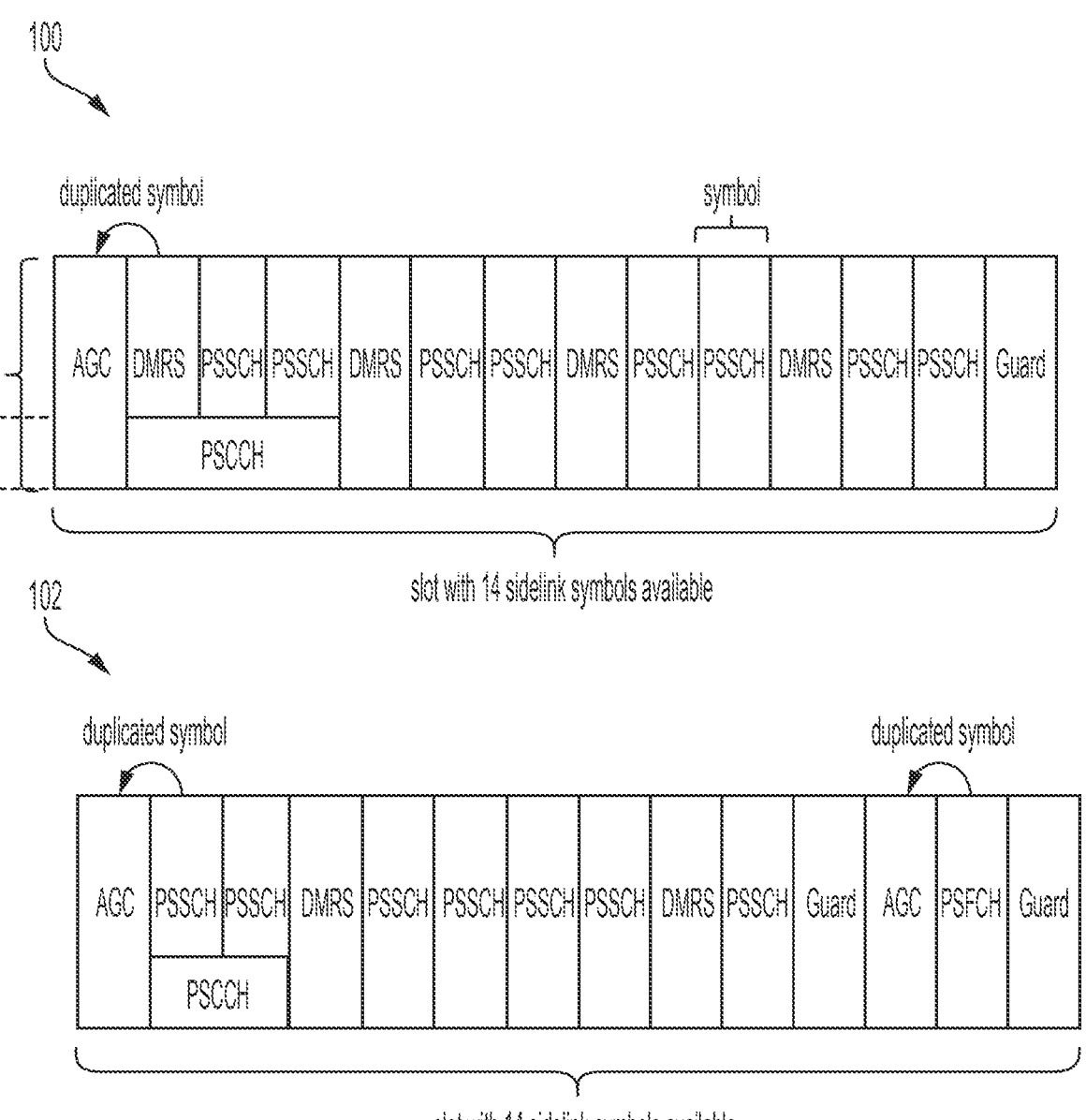
FIG. 1 illustrates an example embodiment NR sidelink (SL) slot format with and without a physical sidelink feedback channel (PSFCH).

In the following detailed description, numerous specific details are set forth to provide a thorough understanding of the disclosure. It will be understood, however, by those skilled in the art that the disclosed aspects may be practiced without these specific details. In other instances, well-known methods, procedures, components, and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (for example, "two-dimensional," "predetermined," "pixel-specific," etc.) may be occasionally interchangeably used with a corresponding non-hyphenated version (for example, "two dimensional," "predetermined," "pixel specific," etc.), and a capitalized entry (for example, "Counter Clock," "Row Select," "PIXOUT," etc.) may be interchangeably used with a corresponding non-capitalized version (for example, "counter clock," "row select," "pix-out," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, when considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it may be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (for example, spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

NR SL allows high data rate communication over relatively short links. This helps preserve the UE Tx power and at the same time allow pairs of UEs to reuse the same spectrum when sufficiently spaced apart. Subsequently, this allowed the NR Rel-16 and 17 SL to offer a wide variety of applications. However, the limited spectrum available for SL transmissions may be limited in the future, for example, when SL communications expand to applications other than V2X.

To improve the situation, NR Rel-18 considers the utilization of the unlicensed band to enable NR UEs to have access to a larger spectrum. In particular, the NR Rel-18 SL WID includes the following:

Study and specify support of SL on unlicensed spectrum for both mode 1 and mode 2 where UE operation for mode 1 is limited to licensed spectrum only [RAN1, RAN2, RAN4].

1. Channel access mechanisms from NR-U shall be reused for SL unlicensed operation.
2. Physical channel design framework: Changes to NR SL physical channel structures and procedures to operate on unlicensed spectrum.

In the unlicensed band, the NR UEs may coexist and contend for resources with other NR UEs as well as other systems that are operating in the unlicensed spectrum (for example, WiFi). In addition, the UEs may abide by the rules of unlicensed channel access mechanisms. The NR UE that performed a reservation to transmit at slot X may perform a LBT procedure before accessing the channel. However, since this sensing duration is random and the channel is shared with other systems, there is no guarantee that the UEs will be able to acquire the channel on time.

To increase the chances of the UE getting the channel, methods, and systems where both the Tx and Rx UEs attempt to acquire the channel for the SL transmission are presented in accordance with the disclosure. In addition, also presented herein, is an approach to utilize the reservation signal in transmitting control information to neighboring UEs in accordance with various embodiments. This approach may facilitate the coordination and COT sharing between Tx and Rx UEs and thus increase the chances of an NR UE in acquiring the channel in the slot in which it intends to transmit. In addition, the control signaling embedded within the reservation signal may allow the NR UEs to share their channel reservations (for example, by allowing the frequency multiplexing of NR UEs' transmissions), in accordance with the disclosure. The same principle, according to some embodiments, may be applied to collaboratively reserve resources for SL synchronization signal block (S-SSB) transmissions, thus improving their chances of having a successful LBT.

Embodiments of the present disclosure enable NR SL operation in the unlicensed spectrum to go beyond Vehicle to Everything (V2X) use cases. In some embodiments, the mode-2 sensing of NR SL may be performed. In some embodiments, the LBT sensing of unlicensed signals in the unlicensed band may meet regulatory requirements.

Embodiments of the present disclosure present approaches to increase the chances of NR UEs in acquiring the unlicensed spectrum for their future transmissions. In some embodiments, Both Tx and Rx UE(s) may attempt to perform LBT before scheduled transmissions. In some embodiments, when a Rx UE acquires the channel on behalf of a Tx UE, it may yield the channel by using a COT sharing concept. In some embodiments, a reservation signal may maintain the channel when an NR UE is able to acquire the channel before the slot boundary of the slot in which it intends to transmit. In some embodiments, a reservation signal may exchange control information between Tx and Rx UEs to initiate the COT sharing and indicate the channel acquisition to the Tx UE.

In addition, in some embodiments, frequency multiplexing may be enabled by NR UEs in the unlicensed spectrum. In some embodiments, the techniques rely on sending a coordination control signal within the reservation signal to allow the resource sharing between NR UEs. In some embodiments, a collaborative reservation approach may be used for SSB transmissions to increase the chances of their LBT success. Further, some embodiments include methods and devices to allow NR UEs to use early in time resources once they have a successful LBT when these early in time resources are not occupied by their neighbors. In some embodiments, these UEs may also be able to cancel their future reservations, to improve the resource utilization. Additionally, in some embodiments, a non-contiguous reservation signal design may allow NR UEs to preserve their transmit power.

Type 1 DL Channel Access Procedure for Unlicensed Spectrum

In some embodiments in accordance with the disclosure, a next generation node B (gNB) may send a transmission after first sensing the channel to be idle during the sensing slot durations of a defer duration $T_d$, and after the counter N is zero in step 4 below (i.e., an LBT approach). The counter N may be adjusted by sensing the channel for additional sensing slot duration(s) according to the steps below in accordance with the disclosure:

1) Set $N=N_{init}$, where $N_{init}$ is a random number uniformly distributed between 0 and $CW_p$, and go to step 4.
2) When N>0 and the eNB/gNB chooses to decrement the counter, set N=N−1.
3) Sense the channel for an additional sensing slot duration, and when the additional sensing slot duration is idle, go to step 4; otherwise, go to step 5.
4) When N=0, stop; otherwise, go to step 2.
5) Sense the channel until either a busy sensing slot is detected within an additional defer duration $T_d$ or all the sensing slots of the additional defer duration $T_d$ are detected to be idle.
6) When the channel is sensed to be idle during all the sensing slot durations of the additional defer duration $T_d$, go to step 4; otherwise, go to step 5.

When an eNB/gNB has not transmitted a transmission after step 4 in the method above, the eNB/gNB may transmit a transmission on the channel, when the channel is sensed to be idle at least in a sensing slot duration $T_{si}$ when the eNB/gNB is ready to transmit and when the channel has been sensed to be idle during all the sensing slot durations of a defer duration $T_d$ immediately before this transmission. When the channel has not been sensed to be idle in a sensing slot duration $T_{si}$ when the eNB/gNB first senses the channel after it is ready to transmit or when the channel has been sensed to be not idle during any of the sensing slot durations of a defer duration $T_d$ immediately before this intended transmission, the eNB/gNB may proceed to step 1 after sensing the channel to be idle during the sensing slot durations of a defer duration $T_d$ in accordance with some embodiments.

The defer duration $T_d$ may consist of duration $T_f=16$ us immediately followed by $m_p$ consecutive sensing slot durations $T_{si}$, and $T_f$ may include an idle sensing slot duration $T_{si}$ at start of $T_f$, in some embodiments.

$CW_{min,p} \le CW_p \le CW_{max,p}$ is the contention window. $CW_p$ adjustment is described in clause 4.1.4 of NR Rel-16.

$CW_{min,p}$ and $CW_{max,p}$ are chosen before step 1 of the procedure above.

$m_p$, $CW_{min,p}$, and $CW_{max,p}$ are based on a channel access priority class p associated with the eNB/gNB transmission, as shown in Table 1.

An eNB/gNB may not transmit on a channel for a Channel Occupancy Time that exceeds $T_{m\ cot,p}$ where the channel access procedures are performed based on a channel access priority class p associated with the eNB/gNB transmissions, as given in Table 1. For p=3 and =4, when the absence of any other technology sharing the channel may be guaranteed on a long-term basis (for example by level of regulation), $T_{m\ cot,p}=10$ ms, otherwise, $T_{m\ cot,p}=8$ ms.

TABLE 1

| Channel Access Priority Class (CAPC) | | | | | |
|---|---|---|---|---|---|
| Channel Access Priority Class (p) | $m_p$ | $CW_{min,\ p}$ | $CW_{max,\ p}$ | $T_{mcot,\ p}$ | allowed $CW_p$ sizes |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

NR-U may use the cyclic prefix (CP) extension to shorten the symbol gap for COT sharing. SL-U may use the CP to shorten the symbol gap as well, according to some embodiments.

Three alternative values are possible for COT sharing in NR-U Rel-16 with a maximum gap of 16 or 25 us:
1) C2*T_sym−T_ta−16 us
2) C3*T_sym−T_ta−25 us or
3) T_sym−25 us.

T_sym is the symbol duration. T_ta is the timing advance between the UL and DL. C2 and C3 have the value between 0 and 1, depending on the deployment scenarios where a large or small amount of timing advance is expected in accordance with the disclosure. Depending on the channel access types, one of these alternatives may be indicated in DCI 0_0, field "ChannelAccess_CPext".

FIG. 1 illustrates an example embodiment NR SL slot format with 100 and without a PSFCH 102. FIG. 1 is illustrated according to NR Rel-16 sidelink slot format.

COT Sharing

Once SL UE has acquired the channel access after successful cat-4 LBT, it may share its COT with some other SL UEs based on different possible conditions. This SL UE may be defined as the initiator UE, and the other SL UE(s) that use the shared COT as the target UE(s) as disclosed herein. The COT sharing between SL-U UEs may take place in SL unicast, groupcast and broadcast communication modes as is disclosed further herein.

Cases Considered for COT-Sharing

Some general rules may apply for COT-sharing scenarios. When a UE transmits due to COT-sharing, the transmission may occur during the mode 2 resource selection window (as according to legacy mode 2 resource allocation, the transmission may take place in the resource selection window). This constraint may be placed so that the mode-2 resource selection procedure may not be excessively affected. In addition, the general rules and regulations for COT-sharing may apply, for example, the COT sharing may be enabled when the time gap between transmission from COT initiator UE and COT target UE is less than a threshold, or the COT sharing has a maximum COT duration. Therefore, three embodiments may be considered (cases 0-2 below), differentiated by when the UE receives the COT sharing indicator as well as the UE behavior after receiving the COT sharing indicator.

Figure 2:
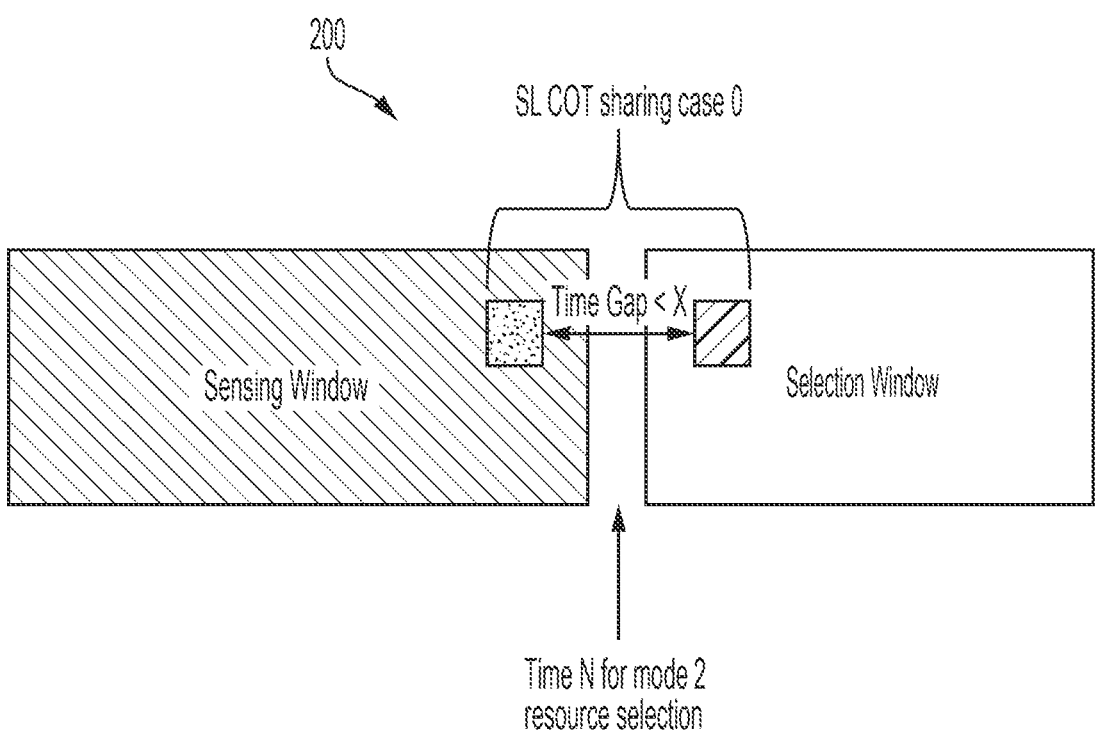
FIG. 2 Illustrates an example embodiment of SL COT sharing identified as case 0.

FIG. 2 Illustrates example embodiment 200 of SL COT sharing, referenced as case 0. In case 0, the COT-sharing indicator may be received during the sensing window. The transmission may occur during the selection window (herein, the sensing window is the mode-2 sensing window, and the selection window is the mode-2 selection window).

Figure 3:
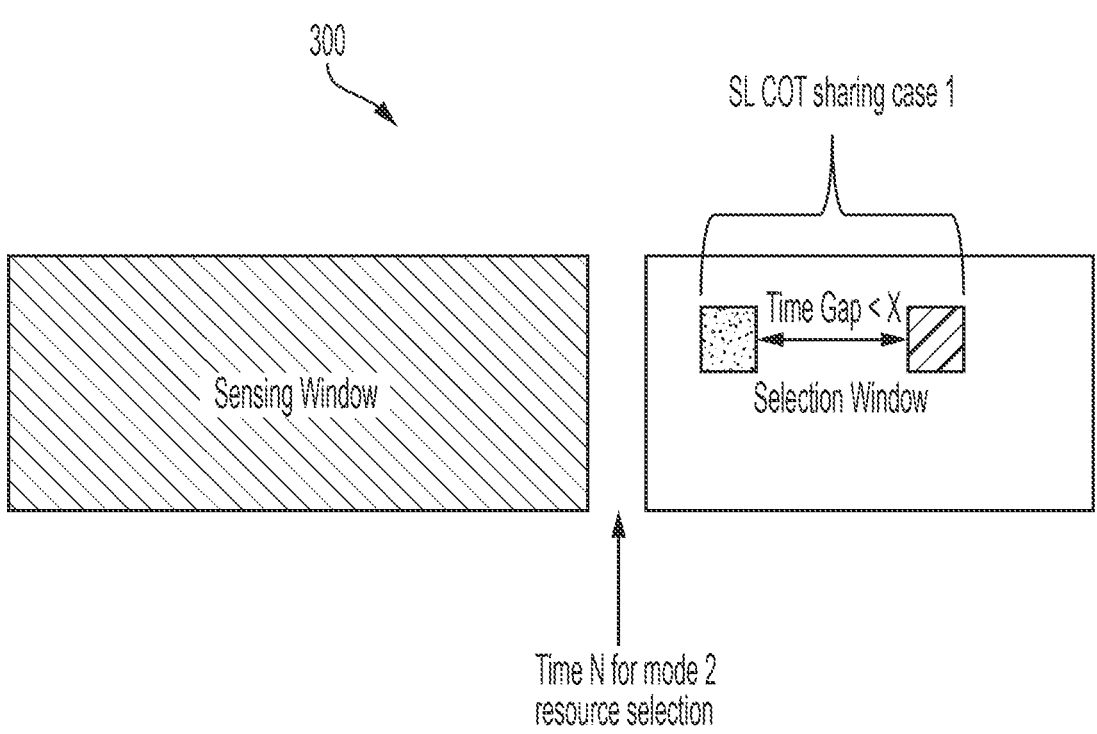
FIG. 3 Illustrates an example embodiment of SL COT sharing identified as case 1.

FIG. 3 Illustrates example embodiment 300 of SL COT sharing referenced as case 1. In case 1, the COT-sharing indicator(s) may be received during the selection window. In this case, one may assume a target SL UE already selected a future resource with the LBT gap for initiating the channel access. It then may receive one or several SC's from other initiator UEs indicating the COT sharing possibility after its sensing window but before the target UE starts the transmission in the selected resource. The resource selected by target UE may fit with the COT sharing opportunities provided by those received COT sharing indications, both in time and frequency. For example, as shown in FIG. 3, the received COT sharing indications provide a set of resources available for COT sharing which includes the resource originally selected by the target UE. Then, the target UE may start data transmission in originally selected resource without LBT, thanks to the COT-sharing provided by the initiator UE(s).

Figure 4:
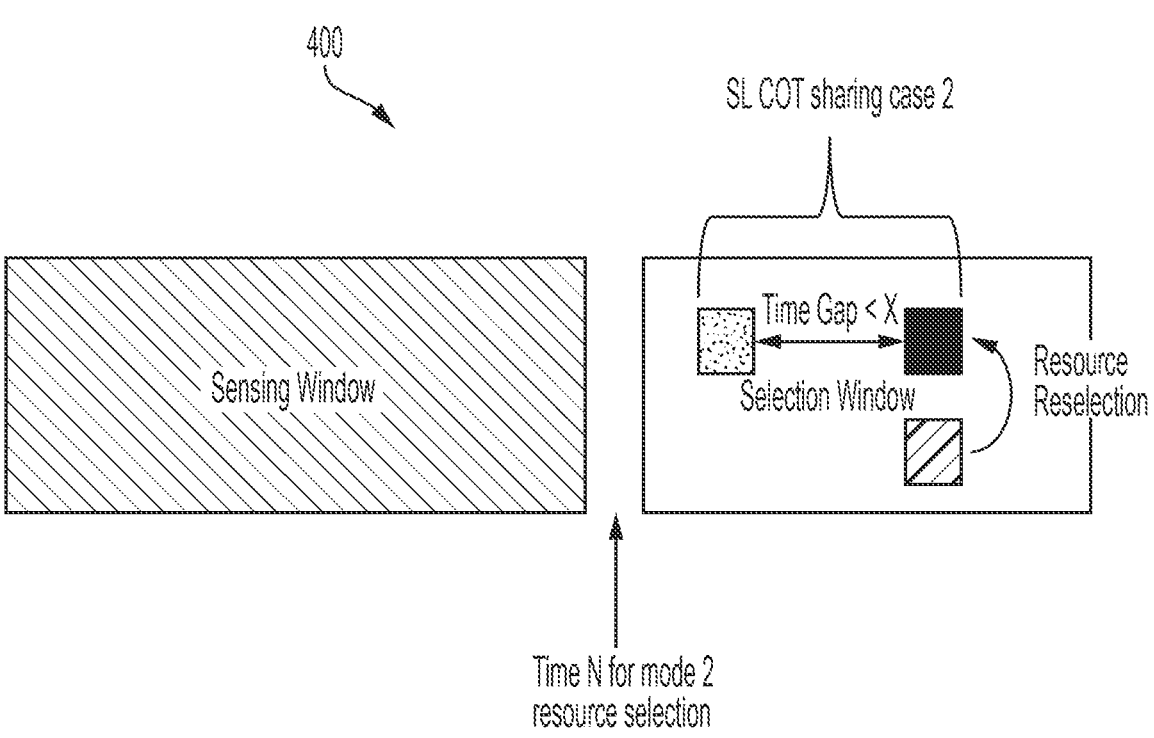
FIG. 4 Illustrates an example embodiment of SL COT sharing identified as case 2.

FIG. 4 Illustrates example embodiment 400 of SL COT sharing referenced as case 2. In case 2, the COT-sharing indicator(s) may be received during the selection window, as in case 1. A target SL UE already selected a future resource with the LBT gap for initiating the channel access. It then may receive one or several SC's from other initiator UEs indicating the COT sharing possibility after its sensing window but before the latest time that target UE is able to re-select a resource, similar to legacy mode 2 resource re-selection. However, the resource selected by target UE may not fit within the COT sharing opportunities provided by those received COT sharing indications.

For example, as shown in FIG. 4, the received COT sharing indications indicate a set of resources available for COT sharing which does not include the resource originally selected by the target UE (for example, due to being on a different subchannel or due to a large time gap). In this case, the target UE may trigger the resource re-selection and try to find a new resource which is included in the set of resources available for COT sharing from the received COT sharing indications and is not excluded from the step 5 and 6 of legacy mode 2 resource selection scheme. When it finds such a new resource, the target UE transmits data in this new resource without LBT. Otherwise, the target UE still keeps the original selected resource for future transmission and performs LBT channel access before starting the transmission.

Reservation Signal

Figure 5:
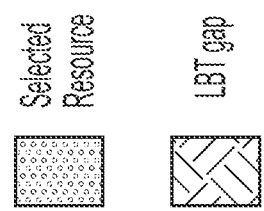
FIG. 5 illustrates an example embodiment of an LBT gap for SL-U slot structure, in accordance with the disclosure.
Figure 5:
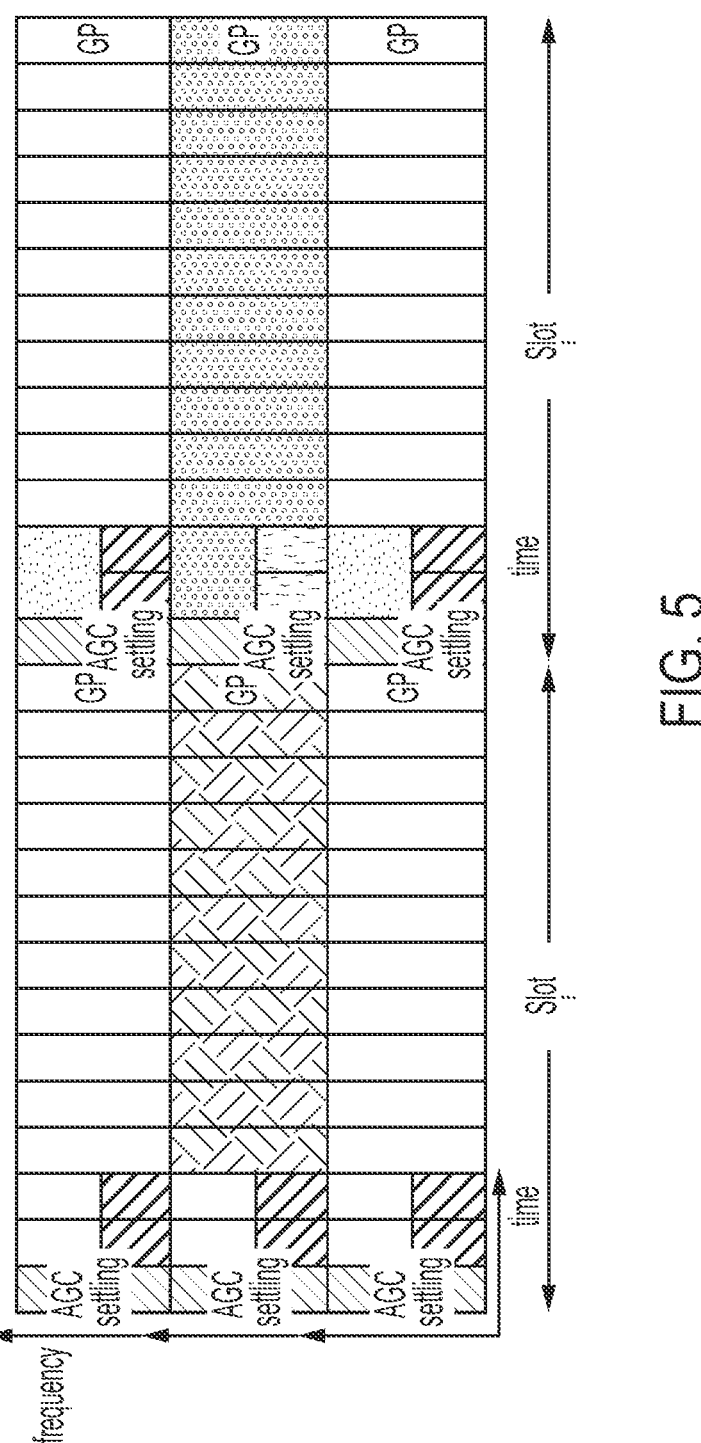
Figure 6:
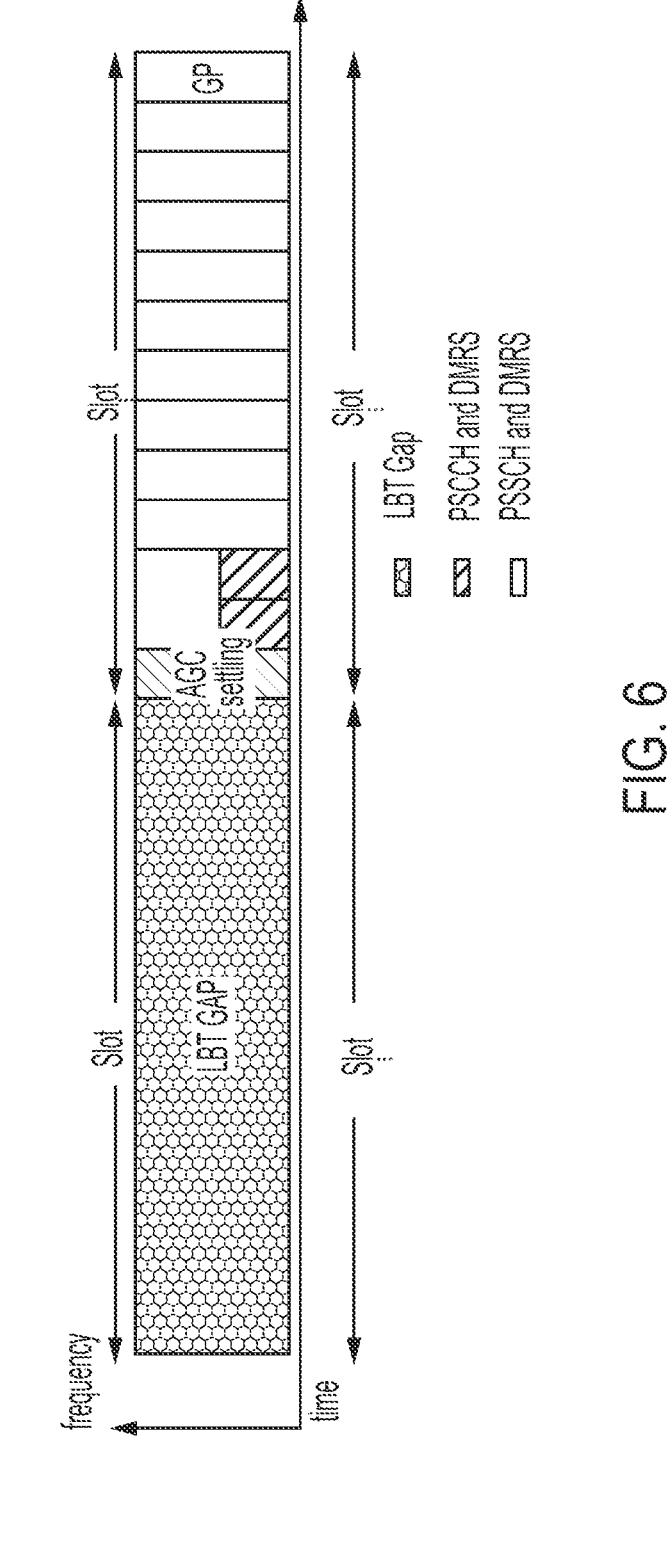
FIG. 6 illustrates an example embodiment of an SL-U slot structure including LBT gap, in accordance with the disclosure.

FIG. 5 illustrates an example embodiment of an LBT gap for SL-U slot structure 500, in accordance with the disclosure. FIG. 6 illustrates an example embodiment of an SL-U slot structure including LBT gap 600, in accordance with the disclosure. In some embodiments of the present disclosure, the LBT gap duration is a set of consecutive symbols in the slot(s) prior to the slot of the selected resources from mode 2 resource allocation or allocated resource from mode 1 resource allocation. This set of consecutive symbols may start from the $1^{st}$ symbol after the physical sidelink control channel (PSCCH), such that the UE may still decode the SC's of other UEs in the current slot before starting to perform LBT channel access, in case the UE may not perform LBT sensing and decoding the PSCCH at the same time (compare to FIG. 5). Alternatively, the LBT gap may occupy the entire slot prior to the SL transmission slot as shown in FIG. 6 below. In some cases, it may be useful to have the configuration of the LBT gap.

This configuration may be done in several ways. For example, according to some embodiments, there may be a set of pre-defined durations of the LBT gaps, where the UE may select and indicate in the 1st stage SCI or second stage SCI, or medium access control (MAC) control element (CE) with some limitations. Further, in other embodiments, it may be configured for the whole resource pool by the network, or per bandwidth part (BWP), or per carrier. In such a case, radio resource signaling (RRC) may be used.

As described above, T_sl=9 us, T_d=16+T_sl*m_p us, m_p=1 and CWp=3 or 7 at priority class 1. The maximum value of CWS=15 for priority class 4. To support LBT Type 1 or Category 4 LBT, multiple symbols per slot or even one slot may be used. It may not be predictable, though, due to the uncertainty of each sensing slot. For example, the UE might not be able to obtain the channel in the LBT gap duration. The UE may transmit closely after sensing, in some embodiments. Given the random duration of sensing (on which 3GPP has no control, given that it is fixed by the regulator), the UE may transmit immediately after having finished sensing plus a fixed duration of the channel sensed idle. Some exemplary embodiments include:

Case 1: the LBT back-off time expires early in the LBT gap so that the time difference between the end of sensing and the beginning of transmission in the next slot is too large. Here, time difference may be defined as the (starting time of next slot—fixed time duration—GP symbol). The fixed time duration is $T_d$ (as defined in Type 1 DL channel access procedure for unlicensed spectrum above) and may be used as part of the type 1 channel access scheme.

Case 2: the LBT back-off expires close enough to the slot boundary so that the time difference may be short enough to enable the UE to transmit at the beginning of the slot. Then, UE may start the SL transmissions in the next slot of the selected resource.

Case 3: the LBT back-off expires after the first slot, sometime during the second slot.

In such a case, the UE may be used to make resource reselection whenever the LBT back-off expires and the channel is sensed idle for a fixed time duration. Then it may start the LBT procedure from the beginning again.

From the legacy sidelink Mode 2 operation perspective, Case 2 may not call for any specific handling. Case 1 and case 3 may utilize some UE behavior changes.

UE Handling of Case 1

Figure 7:
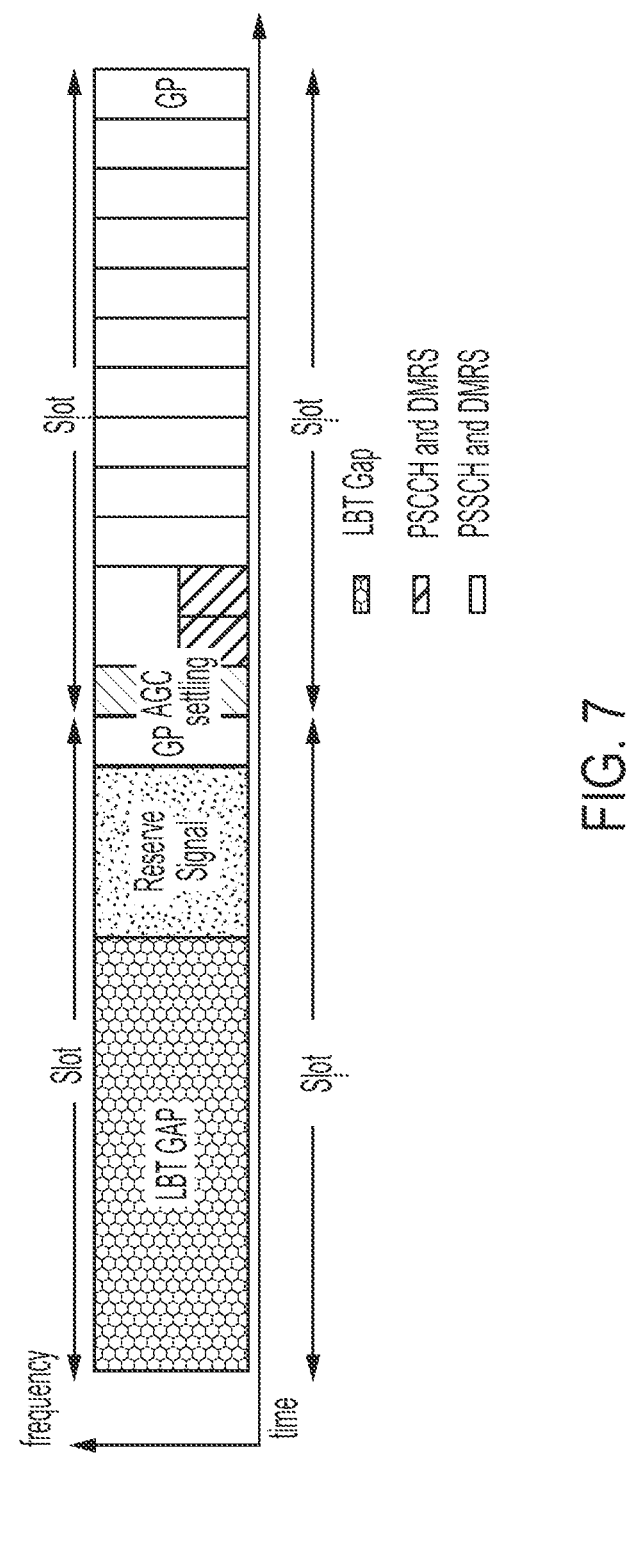
FIG. 7 illustrates an example embodiment when the LBT back-off timer expires before the starting of next slot (fixed time duration—GP symbol), in accordance with the disclosure.

FIG. 7 illustrates an example embodiment when the LBT back-off timer expires before the starting of next slot (fixed time duration—GP symbol) 700, in accordance with the disclosure. For case 1, the UE may transmit before the next slot. Thus, for this case, the UE may transmit as shown in FIG. 7. The reservation signal may be, for example:

Reference signals, for example, SL demodulation reference signal (DMRS).

Duplications of the first symbols of the next slot of the PSCCH and physical sidelink shared channel (PSSCH) to be transmitted in the slot, according to some embodiments. In such a case, the receiving UE may not need to decode and store these data. However, decoding and storing the data may be beneficial. For example, the transmitter may transmit the PSSCH transmission in the remaining symbols in the current slot before sending the PSCCH in the next slot. In this case, the potential receiver UE may buffer the PSSCH data before decoding the PSCCH in the next slot. Once the UE decodes the PSCCH in the next slot, the UE may decide whether the previous PSSCH data is meant for it or not.

A power signal with no information, according to some embodiments, as described herein.

UE Handling of Case 3

Figure 8:
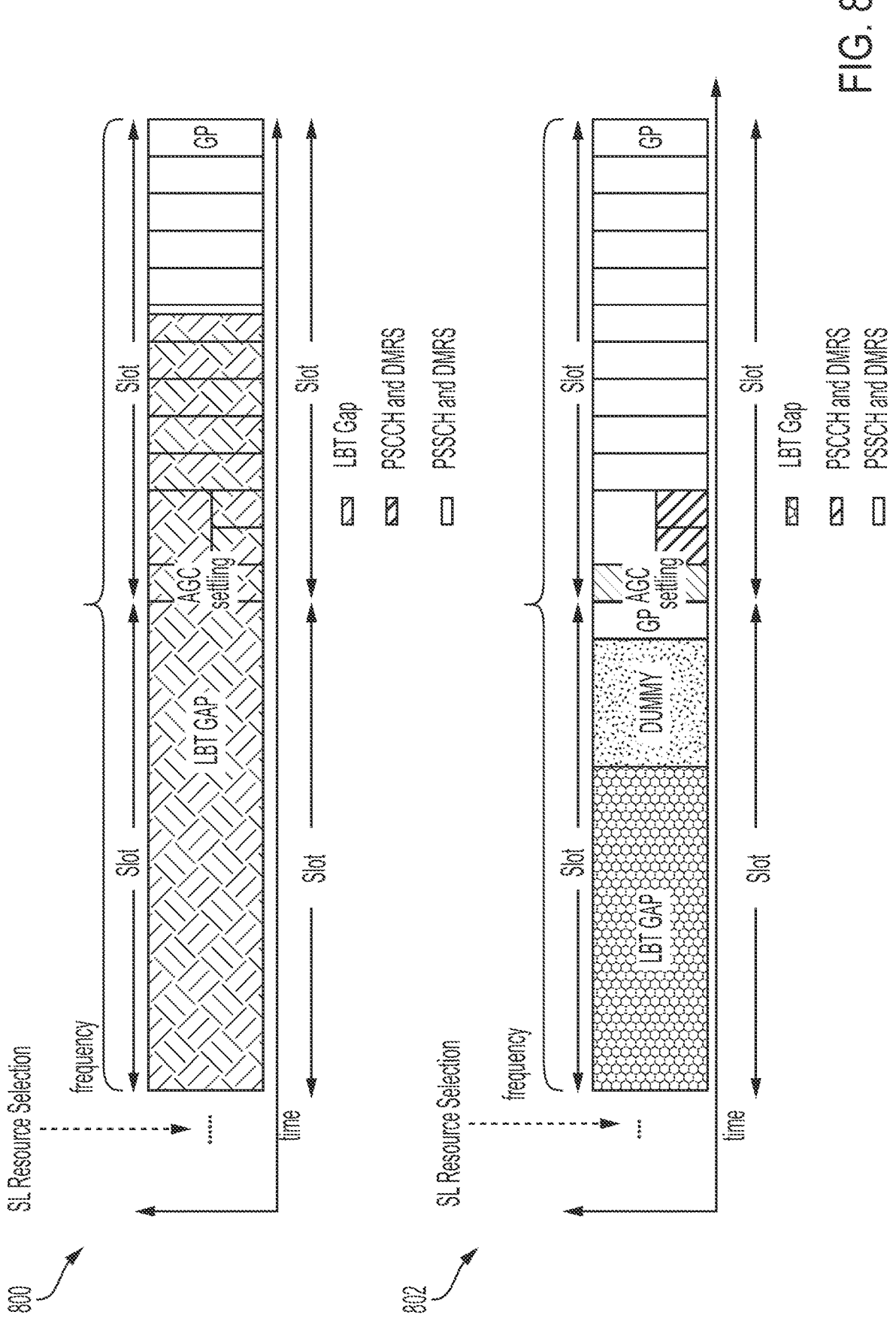
FIG. 8 illustrates an example embodiment when the LBT back-off timer expires after the starting of next slot (fixed time duration—GP symbol), in accordance with the disclosure.

FIG. 8 illustrates an example embodiment when the LBT back-off timer expires after the starting of next slot (fixed time duration—GP symbol), in accordance with the disclosure. According to some embodiments, when the UE LBT gap ends after the slot boundary (as shown in FIG. 8), this case should be viewed as triggering SL resource reselection. In case the UE may perform LBT sensing and PSCCH decoding at the same time, the resource reselection may immediately start once the UE LBT deferring period expanded into the 1st or X symbol of the next slot, possibly with a higher transmission priority than the previous selection. When LBT deferring period still does not complete until the 1st symbol of the new selected resource, the resource reselection may take place again up to a maximum value with a higher priority than the previous selection.

Resource Selection Procedures for NR UEs

Mode 2

Mode 2 may be for UE autonomous resource selection. Mode 2's basic structure is of a UE sensing, within a (pre-)configured resource pool, which resources are not in use by other UEs with higher-priority traffic, and choosing an appropriate amount of such resources for its own transmissions, according to some embodiments. Having selected such resources, the UE may transmit and re-transmit in them a certain number of times, or until a cause of resource reselection is triggered.

According to some embodiments, the mode 2 sensing procedure may select and then reserve resources for a variety of purposes reflecting that NR V2X introduces sidelink hybrid automatic repeat request (HARQ) in support of unicast and groupcast in the physical layer. It may reserve resources to be used for a number of blind (re-)transmissions or HARQ-feedback-based (re-)transmissions of a transport block, in which case the resources are indicated in the SCI(s) scheduling the transport block. Alternatively, it may select resources to be used for the initial transmission of a later transport block, in which case the resources may be indicated in an SCI scheduling a current transport block, in a manner similar to the LTE-V2X scheme. Finally, an initial transmission of a transport block may be performed after sensing and resource selection, but without a reservation, in accordance with the disclosure.

In some embodiments, the first-stage SC's transmitted by UEs on PSCCH may indicate the time-frequency resources in which the UE will transmit a PSSCH. These SCI transmissions may be used by sensing UEs to maintain a record of which resources have been reserved by other UEs in the recent past, in accordance with the disclosure. When a resource selection is triggered (for example by traffic arrival or a re-selection trigger), the UE may consider a sensing window which starts a (pre-)configured time in the past and finishes shortly before the trigger time. The window may be either 1100 ms or 100 ms wide, with the intention that the 100 ms option is particularly useful for aperiodic traffic, and 1100 ms particularly for periodic traffic in accordance with the disclosure. A sensing UE also may measure the sidelink reference signal received power (SL-RSRP) in the slots of the sensing window, which implies the level of interference which would be caused and experienced when the sensing UE were to transmit in them. In NR-V2X, SL-RSRP is a (pre-)configurable measurement of either PSSCH-RSRP or PSCCH-RSRP.

In some embodiments, the sensing UE then selects resources for its (re-) transmission(s) from within a resource selection window. The window may start shortly after the trigger for (re-) selection of resources and may not be longer than the remaining latency budget of the packet due to be transmitted, in accordance with the disclosure. Reserved resources in the selection window with SL-RSRP above a threshold may be excluded from being candidates by the sensing UE, with the threshold set according to the priorities of the traffic of the sensing and transmitting UEs. Thus, a higher priority transmission from a sensing UE may occupy resources which are reserved by a transmitting UE with sufficiently low SL-RSRP and sufficiently lower-priority traffic.

In some embodiments, when the set of resources in the selection window which have not been excluded is less than a certain proportion of the available resources within the window, the SL-RSRP exclusion threshold may be relaxed in 3 dB steps. The proportion may be set by (pre-)configuration to 20%, 35%, or 50% for each traffic priority. The UE may select an appropriate amount of resources randomly from this non-excluded set. The resources selected may not be in general periodic, in some embodiments. Up to three resources may be indicated in each SCI transmission, which may each be independently located in time and frequency. When the indicated resources are for semi-persistent transmission of another transport block, the range of supported periodicities is expanded compared to LTE-V2X, in order to cover the broader set of envisioned use cases in NR-V2X.

In some embodiments, shortly before transmitting in a reserved resource, a sensing UE may re-evaluate the set of resources from which it may select, to check whether its intended transmission is still suitable, taking account of late-arriving SC's due, typically, to an aperiodic higher-priority service starting to transmit after the end of the original sensing window. When the reserved resources would not be part of the set for selection at this time (T3), then new resources may be selected from the updated resource selection window. The cut-off time T3 may be long enough before transmission to allow the UE to perform the calculations relating to resource re-selection.

In some embodiments, there may be a number of triggers for resource re-selection, several of which are similar to LTE-V2X. In addition, there is the possibility to configure a resource pool with a pre-emption function designed to help accommodate aperiodic sidelink traffic, so that a UE reselects all the resources it has already reserved in a particular slot when another nearby UE with higher priority indicates it will transmit in any of them, implying a high-priority aperiodic traffic arrival at the other UE, and the SL-RSRP is above the exclusion threshold. The application of pre-emption may apply between all priorities of data traffic, or only when the priority of the pre-empting traffic is higher than a threshold and higher than that of the pre-empted traffic. A UE does not need to consider the possibility of pre-emption later than time T3 before the particular slot containing the reserved resources.

Figure 9:
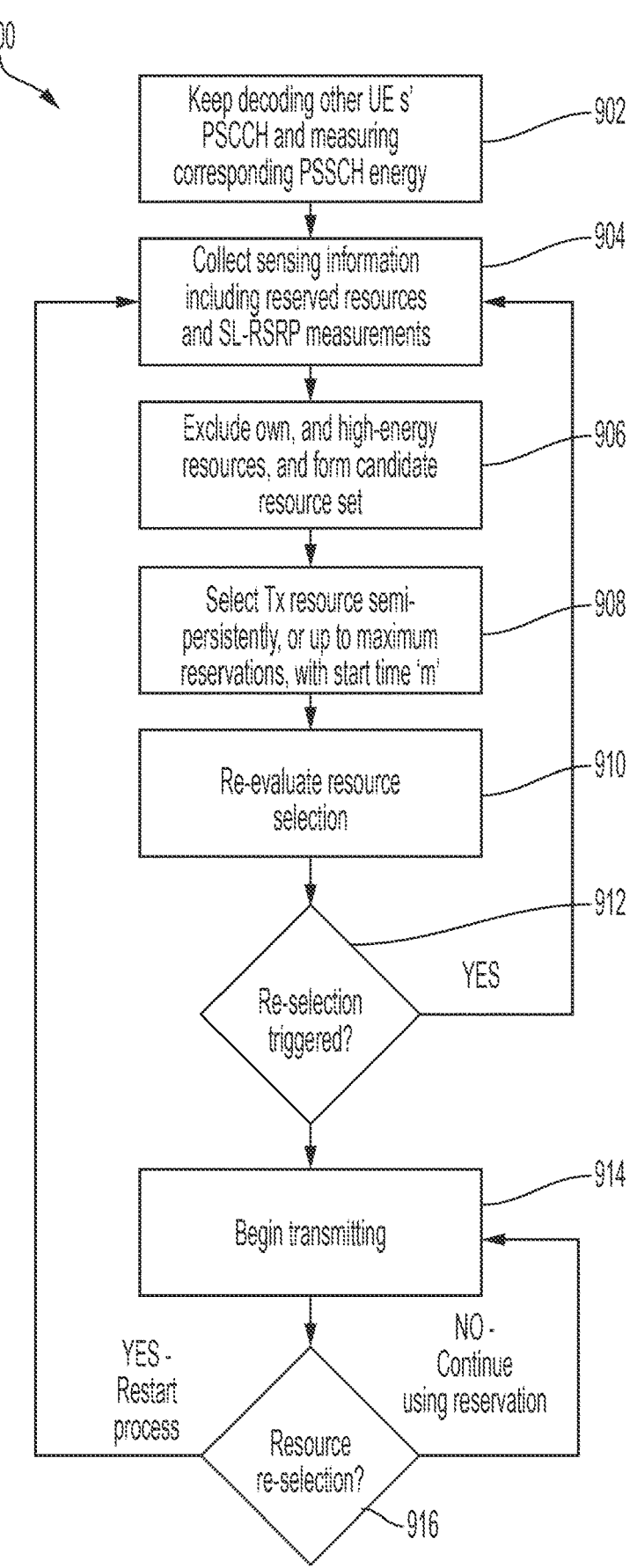
FIG. 9. illustrates an example embodiment of a method of sensing and resource (re-)selection procedures, in accordance with the disclosure.

FIG. 9. illustrates an example embodiment of a method 900 of sensing and resource (re-)selection procedures, in accordance with the disclosure. In block 902 a UE may decode other UE's PSCCH and measure the corresponding PSSCH energy and proceed to block 904. In block 904 the UE may collect sensing information including reserved resources and SL-RSRP measurements and proceed to block 906. In block 906 the UE may exclude its own, and high-energy resources, and form a candidate resource set and proceed to block 908.

In block 908 the UE may select a Tx resource semi-persistently, or up to a maximum reservation, with start time 'm' for example and proceed to block 910. In block 910 the UE may reevaluate its resource selection and proceed to block 912. In block 912 the UE may verify whether the reselection was triggered. When the reselection was triggered, the UE may return to block 904 to continue collecting sensing information. When the reselection was not triggered the UE may move to block 914. In block 914 the UE may begin transmitting and proceed to block 916. In block 916 the UE may verify again whether to do resource reselection. When it determines to perform resource reselection the UE may move back to block 904. When the UE determines not to perform resource reselection it may return to block 914 to begin transmitting, and continue using the reservation.

Rel-16 NR-U DL Channel Access Procedures in a Shared Channel Occupancy

In some embodiments, when a gNB shares a channel occupancy initiated by a UE using the channel access procedures described in clause 4.2.1.1 of Rel-16, on a channel, the gNB may transmit a transmission that follows an UL transmission on scheduled resources or a PUSCH transmission on configured resources by the UE after a gap as follows:

The transmission may contain transmission to the UE that initiated the channel occupancy and may include non-unicast and/or unicast transmissions where any unicast transmission that includes user plane data is only transmitted to the UE that initiated the channel occupancy, according to some embodiments.

When the higher layer parameters ul-toDL-COT-SharingED-Threshold-r16 is not provided, the transmission may not include any unicast transmissions with user plane data and the transmission duration is not more than the duration of 2, 4 and 8 symbols for subcarrier spacing of 15, 30 and 60 kHz of the corresponding channel, respectively.

When the gap is up to 16 us, the gNB may transmit the transmission on the channel after performing Type 2C DL channel access as described in clause 4.1.2.3 of Rel-16.

When the gap is 25 us or 16 us, the gNB may transmit the transmission on the channel after performing Type 2A or Type 2B DL channel access procedures as described in clause 4.1.2.1 and 4.1.2.2 of Rel-16, respectively.

When a gNB shares a channel occupancy initiated by a UE with configured grant PUSCH transmission, the gNB may transmit a transmission that follows the configured grant PUSCH transmission by the UE as follows:

When the higher layer parameter ul-toDL-COT-SharingED-Threshold-r16 is provided, the UE may be configured by cg-COT-SharingList-r16 where cg-COT-SharingList-r16 provides a table configured by higher layer. Each row of the table may provide a channel occupancy sharing information given by higher layer parameter CG-COT-Sharing-r16. One row of the table is configured for indicating that the channel occupancy sharing is not available, in accordance with the disclosure.

When the 'COT sharing information' in CG-UCI detected in slot n indicates a row index that corresponds to a CG-COT-Sharing-r16 that provides channel occupancy sharing information, the gNB may share the UE channel occupancy assuming a channel access priority class p=channelAccessPriority-r16, starting from slot n+O, where O=offset-r16 slots, for a duration of D=duration-r16 slots where duration-r16, offset-r16, and channelAccessPriority-r16 are higher layer parameters provided by CG-COT-Sharing-r16.

When the higher layer parameter ul-toDL-COT-SharingED-Threshold-r16 is not provided, and when 'COT sharing information' in CG-UCI indicates '1', the gNB may share the UE channel occupancy and start the DL transmission X=cg-COT-SharingOffset-r16 symbols from the end of the slot where CG-UCI is detected, where cg-COT-SharingOffset-r16 is provided by higher layer. The transmission may not include any unicast transmissions with user plane data and the transmission duration is not more than the duration of 2, 4 and 8 symbols for subcarrier spacing of 15, 30 and 60 kHz of the corresponding channel, respectively, in accordance with the disclosure.

When a gNB uses channel access procedures as described in clause 4.1.1 of Rel-16 to initiate a transmission and shares the corresponding channel occupancy with a UE that transmits a transmission as described in clause 4.2.1.2 of Rel-16, the gNB may transmit a transmission within its channel occupancy that follows the UE's transmission when any gap between any two transmissions in the gNB channel occupancy is at most 25 us. In this case the following applies:

When the gap is 25 us or 16 us, the gNB may transmit the transmission on the channel after performing Type 2A or 2B DL channel access procedures as described in clause 4.1.2.1 and 4.1.2.2 of Rel-16, respectively.

When the gap is up to 16 us, the gNB may transmit the transmission on the channel after performing Type 2C DL channel access as described in clause 4.1.2.3.

In some embodiments, there may be a desire to enable NR sidelink operation in the unlicensed spectrum to go beyond V2X use cases. One of the issues with SL-Unlicensed is that two types of sensing may be done, the mode-2 sensing of NR sidelink and/or the LBT sensing of unlicensed to meet regulatory requirements.

Because the NR UE is performing two types of sensing in the unlicensed band, it may be more conservative than other devices sharing the unlicensed band. This may not ensure fair access to the channel. Therefore, there is a use for a procedure to improve the chances of a SL-U device accessing the media, in accordance with the disclosure. Additionally, when the UE performs LBT, the sensing duration may be unknown. The UE may thus obtain the channel earlier than the slot boundary and accordingly it may transmit in order to get the channel. Thus, there is a use to design a signal to occupy the channel before the 'regular' sidelink transmission at the slot boundary.

In this disclosure is disclosed approaches to increase the chances of NR UEs in acquiring the unlicensed spectrum for their future transmissions, according to some embodiments. For example, both Tx and Rx UE(s) may attempt to perform LBT before a scheduled transmission, in some embodiments. In other embodiments, when an Rx UE acquires the channel on behalf of a Tx UE, it may yield the channel by using the COT sharing concept.

A reservation signal is designed to serve two purposes. 1) Maintain the channel when an NR UE was able to acquire the channel before the slot boundary of the slot in which it intends to transmit. 2) Exchange control information between Tx and Rx UEs to initiate the COT sharing and indicate the channel acquisition to the Tx UE.

In addition, also described, in accordance with the disclosure are techniques to enable the frequency multiplexing of NR UEs in the unlicensed spectrum. The disclosed techniques rely mainly on sending a coordination control signal within the reservation signal to allow the resource sharing between NR UEs. Furthermore, a collaborative reservation approach is also described, in accordance with the disclosure, for SSB transmissions to increase the chances of their LBT success. Furthermore, herein is described, in accordance with the disclosure is a technique to allow NR UEs to use early in time resources once they have a successful LBT when these early in time resources are not occupied by their neighbors, according to some embodiments. These UEs are also able to cancel their future reservations to improve the resource utilization. Finally, a non-contiguous reservation signal design is described, in accordance with the disclosure, to allow NR UEs to preserve their transmit power.

Rx UE Assisted LBT Procedure for Unlicensed SL Operations

In some embodiments, to transmit in the unlicensed band, NR UEs may perform an LBT operation wherein they sense the channel and only when the channel is empty for a duration equal to their selected LBT sensing duration within their contention window they will be allowed to access the channel and transmit their data (cf. Section 2.A). Due to LBT, there may be no guarantee that the UE will be granted access to the channel despite the fact that it might have a future reservation. To increase the chances of acquiring the channel for a transmission, an NR UE may rely on the concept of COT sharing between neighboring UEs. In particular, in case of unicast or a groupcast option 2, the Tx UE may be assisted by the Rx UE(s) when performing the LBT before the intended slot for the future transmission. In particular, LBT sensing may be done by the Tx and Rx UE(s) followed by a COT sharing in case an Rx UE(s) was able to acquire the channel before the Tx UE. In this case when a Tx UE (for example, UE-A) wants to transmit to UE-B in slot X based on a previous reservation, then both UEs will attempt to perform LBT at slot X-1 or earlier as needed based on priority (for example, LBT may be triggered at different times before an intended future transmission based on priority). Subsequently, one of the following four cases may occur when the UEs attempt LBT sensing in slot X-1 to perform a transmission at previously reserved resource in slot X:

In some embodiments, UE-A acquires the channel and sends a reservation signal in slot X-1 followed by the actual transmission to UE-B in slot X. Note that the reservation signal sent here is not the same as a reservation sent in the SCI of a regular sidelink transmission. The reservation signal is a signal to occupy the channel until the beginning of the slot after LBT succeeded.

Figure 10:
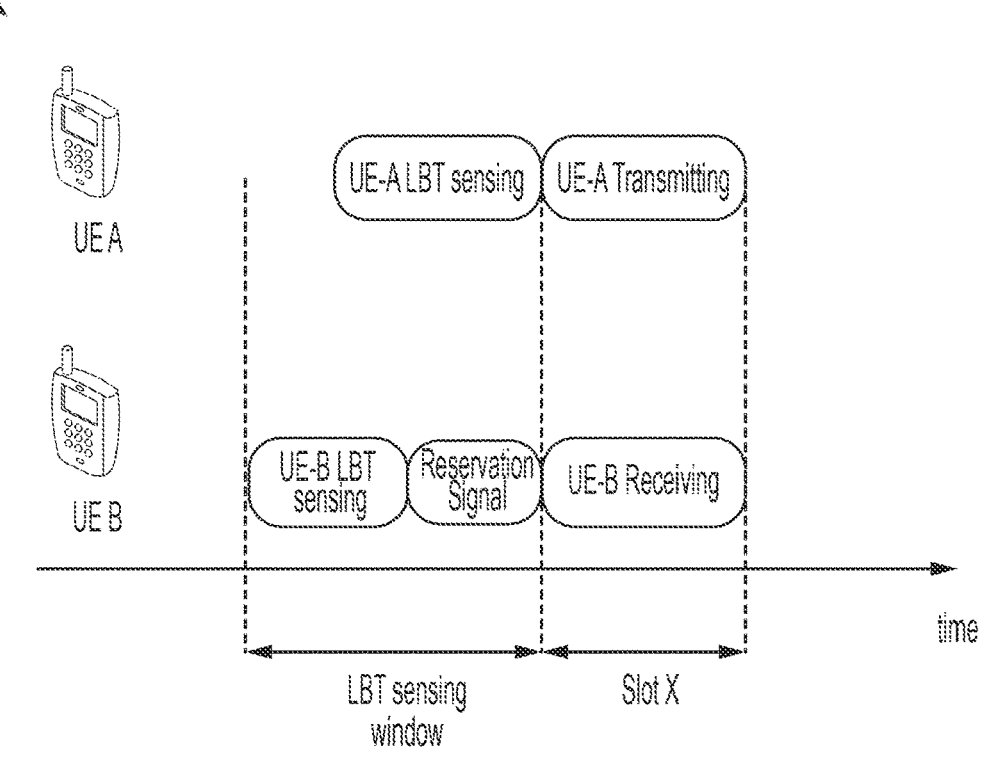
FIG. 10 illustrates an example embodiment of collaborative LBT sensing between Transmitting (Tx) and Receiving (Rx) UEs, in accordance with the disclosure.

FIG. 10 illustrates example embodiments of collaborative LBT sensing between Tx and Rx UEs, in accordance with the disclosure. FIG. 10 illustrates the timeline of the first and second cases described below. Collaborative LBT sensing embodiment 1000 illustrates how UE-B may acquire the channel and send a reservation signal with an indication in slot X-1 so that UE-A is aware that this is a dummy reservation by UE-B, according to some embodiments. Subsequently, UE-A may send its actual transmission in slot X to UE-B. Subsequently, UE-B may switch to the Rx mode in slot X and UE-A may send the actual data transmission to UE-B in slot X.

Collaborative LBT sensing embodiment 1002 illustrates when both UEs may acquire the channel and send the reservation signal in slot X-1 simultaneously. Subsequently, UE-B may switch to the Rx mode in slot X and UE-A may send the actual data transmission to UE-B in slot X.

In some embodiments, none of the UEs may acquire the channel in slot X-1. Subsequently, UE-A may trigger a resource reselection to find a different resource.

When this approach is followed, it may be similar to the COT sharing concept where a Tx UE may share the channel reservation with an Rx UE. In addition, this may also be similar to the COT sharing in NR-U wherein the gNB may share the reserved resource with an Rx UE. A benefit of this approach is that the chances of UE-A being able to transmit in slot X may significantly increase in case of unicast and may be up to multiple folds in case of groupcast option 2 with Y target UEs. On the other hand, extra power may be transmitted when both UEs send a reservation signal. This is because, when UE-B acquires the channel before UE-A then only UE-B will send the reservation signal and thus there is no loss in power because UE-A would have sent the reservation signal anyway to acquire the channel. Therefore, the only loss may occur when both UEs acquire the channel early in time and simultaneously transmit reservation signals because one of the reservation signals may be redundant. The likelihood of this is low. Further, the engagement of the Rx UE in assisting the Tx UE in LBT sensing may be done only for TBs with priority above a threshold in some embodiments.

Figure 11:
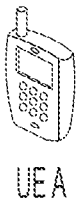
FIG. 11 illustrates an example embodiment of the hidden node problem, in accordance with the disclosure.
Figure 11:
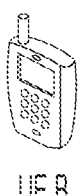
Figure 11:

In addition to increasing the chances of channel acquisition, embodiments described herein, help in extending the sensing range of a Tx UE and thus may help resolve the hidden node problem. When there exists another device that is attempting to acquire the channel and is close to the Rx UE but far enough such that the reservation signal is not detectable by the Tx UE, then it may be considered as a hidden node and accordingly when it transmits it will interfere with the transmission of the Tx UE. For example, in FIG. 11, when UE-A attempts to reach UE-B and perform the LBT, even when it was able to acquire the channel and transmit, it might end up failing to reach UE-B due to a collision with UE-C when it intends to transmit on the same resource. FIG. 11 illustrates an example embodiment of the hidden node problem, in accordance with the disclosure.

In some embodiments, however, when the Rx UE also sends the reservation signal it may be able to notify the Tx UE that the channel is reserved and subsequently the NR UE will not attempt to transmit in this slot. This is similar to the conflict indication wherein the Rx UE uses the PSFCH to send a conflict indication message to a neighboring UE to avoid a future conflict. Hence, in some cases, it may be beneficial that the Rx UE also sends a reservation signal when the Tx UE was successfully able to pass the LBT sensing to resolve the hidden node problem. This may be done based on resource pool configuration.

In some embodiments, the procedure of having both the receiver and transmitter UE performing LBT, while beneficial to the link, may also slightly increase overhead. Consequently, it may not always be enabled. Thus, the decision to have both UEs doing LBT may be signaled as follows:

Per priority level, with the RX UE doing LBT only for high priority packets, according to some embodiments.

Per UE, with for example, an RRC message or a flag in the SCI to indicate when this procedure is enabled.

Per resource pool, according to some embodiments.

Per CBR level—the procedure may be enabled below a given CBR threshold and prevented above the threshold.

Reservation signal is considered according to some embodiments, as described herein. When only power is transmitted, the Tx UE may not be able to identify whether the channel is acquired by the Rx UE or by another NR UR or even another system (for example, Wifi) that is operating in the unlicensed band. Simply, the reservation signal may not be only power signal and may contain control information. One purpose of this control information includes to indicate that the Rx UE is the one that acquired the channel. In addition, the control information may also indicate to the Tx UE (or to one of the Tx UEs in case of the hidden node problem discussed above) the presence of a COT sharing opportunity so that it may transmit its payload in the intended slot (in other words, the Rx UE may not use the channel to send its own data but rather to receive from the Tx UE). Embodiments detailing the reservation signal design, along with the possible control messages is presented herein.

Figure 12:
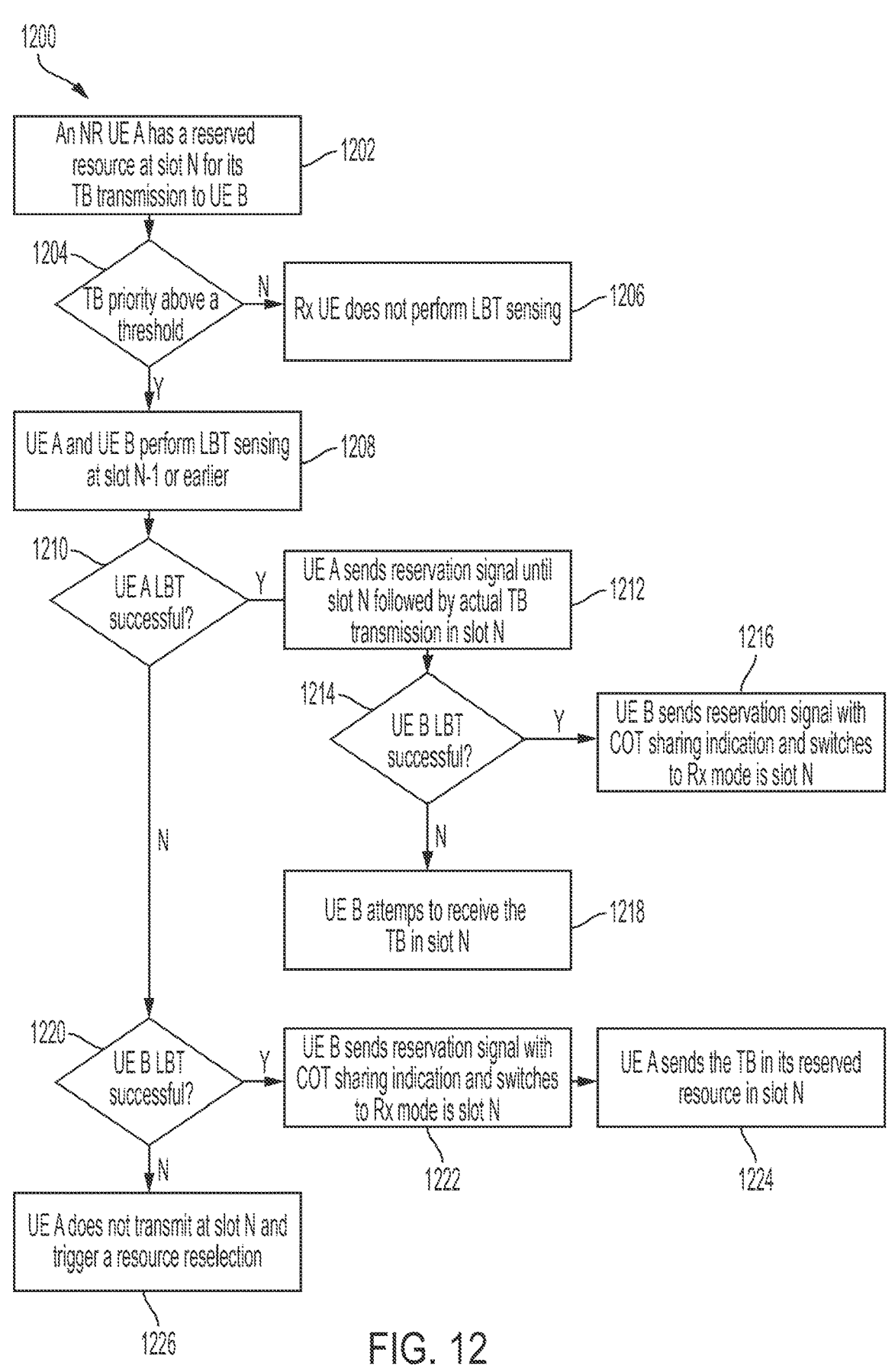
FIG. 12 illustrates an example embodiment of a method for an Rx UE assisted LBT procedure, in accordance with the disclosure.

FIG. 12 illustrates an example embodiment of a method, 1200, for an Rx UE assisted LBT procedure, in accordance with the disclosure. Method 1200 includes an example embodiment of how to improve the chances of an LBT success. The method 1200 may begin in block 1202 where, for example, NR UE A has a reserved resource at slot N for its TB transmission to EU B. In block 1204 the NR UE A may check when it has a TB priority above a threshold. When the priority is not above the threshold the Rx UE may not perform LBT sensing according to block 1206. When the priority is above the threshold, UE A and UE B may perform LBT sensing at slot N-1 or earlier.

Next, block 1210 UE A may determine when the LBT sensing was successful. When the LBT sensing was successful the UE A may send a reservation signal until slot N, followed by an actual TB transmission in slot N according to block 1212. Next, in block 1214 UE B may check whether the LBT is successful. When this check is determined to be successful, UE B may send a reservation signal with a COT sharing indication and switch to Rx mode in slot N according to block 1216. When the LBT was unsuccessful, the UE B may attempt to receive the TB in slot N according to block 1218.

When the UE A LBT was unsuccessful, the UE B LBT may check when it was successful according to block 1220. When this check is deemed successful, the UE B may send a reservation signal with COT sharing indication and switch to Rx mode in slot N according to block 1222. Next, UE A may send the TB in its reserved resource in slot N according to block 1224. When the UE B LBT was unsuccessful the UE A may not transmit at slot N and trigger a resource reselection according to block 1226.

According to some embodiments, in case of unicast or groupcast transmissions, an Rx UE(s) may assist the Tx UE when performing LBT before an intended future resource for transmission to increase the chances of channel acquisition, in accordance with the disclosure. In some embodiments, when an Rx UE successfully acquires the channel, it may send a reservation signal carrying control information to the Tx UE that the LBT was successful and that this channel acquisition was done on behalf of the Tx UE, in accordance with the disclosure. In further embodiments, an Rx UE that was able to acquire the channel on behalf of a Tx UE may switch to the Rx mode after sending the reservation signal to be able to receive from the Tx UE in the future intended slot. In yet additional embodiments, a Tx UE that receives a reservation signal with control signaling indicating that the Rx UE reserved the channel on behalf of the Tx UE may declare its LBT as successful and attempt to perform a transmission in the intended slot for its transmission.

Reservation Signal Design

In some embodiments, the concept of a reservation signal may allow UEs to acquire the channel when their LBT was successful before the beginning of a slot boundary. This signal may have been used mainly as a reservation signal and was not intended to carry any data or control. However, a significant advantage may be achieved when a special reservation signal is introduced with a specific structure that carries either control or an indication that the reservation is done by a specific NR UE, as discussed in the previous section. To achieve this goal, a PSFCH-like approach may be considered whereby a sequence detected in a specific RB and a specific symbol may indicate that the reservation is done by an NR Rx UE. For example, when a UE-A intends to transmit in a specific slot X to UE-B, then UE-B may also attempt to acquire the channel in slot X-1 and send the reservation signal with control signaling which indicates that this reservation is done on behalf of the Tx UE. The remaining portion of the reservation signal, not occupied by the control signaling, may be used to carry data, or may be a power reservation signal.

Time Domain Allocation of Control Signaling in Reservation Signal

Figure 13:
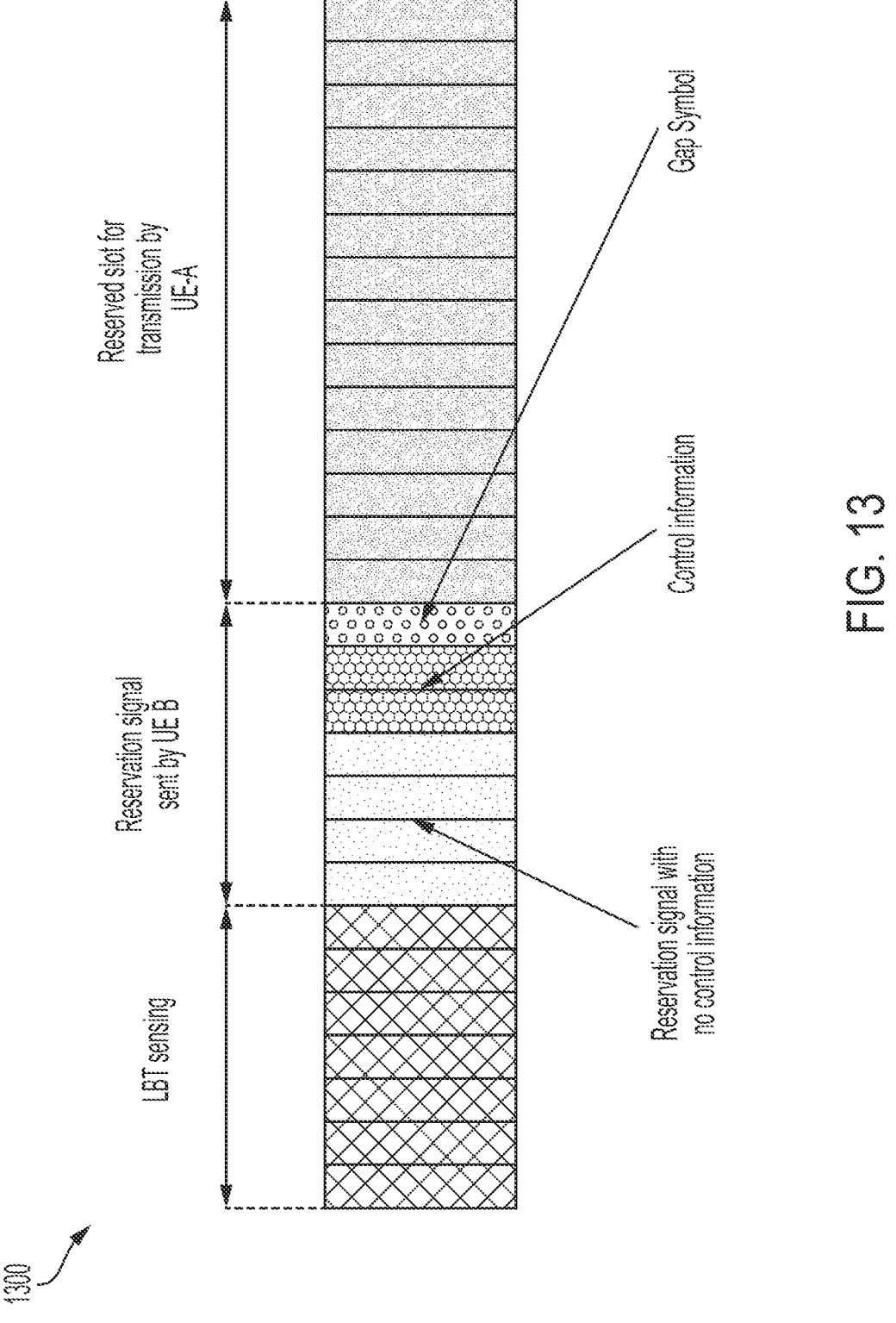
FIG. 13 illustrates an example embodiment of the location of control signaling information within the reservation signal, in accordance with the disclosure.

FIG. 13 illustrates an example embodiment 1300 of the location of control signaling information within the reservation signal, in accordance with the disclosure. In some embodiments, the reservation signal may be structured as follows from the time domain perspective:

A reservation signal with no control signaling in any symbol except the last symbol or the one previous to the last symbol before the Tx/Rx switch: For example, when the reservation signal covers 7 symbols with the last one being a gap symbol (or partial gap to avoid losing the COT), then the Rx UE may send the reservation signal indication in either symbol 5 or 6 that may be decoded by the Tx UE while just sending an empty reservation signal in the remaining symbols. The control signal may also be repeated for AGC training, according to some embodiments.

Figure 14:
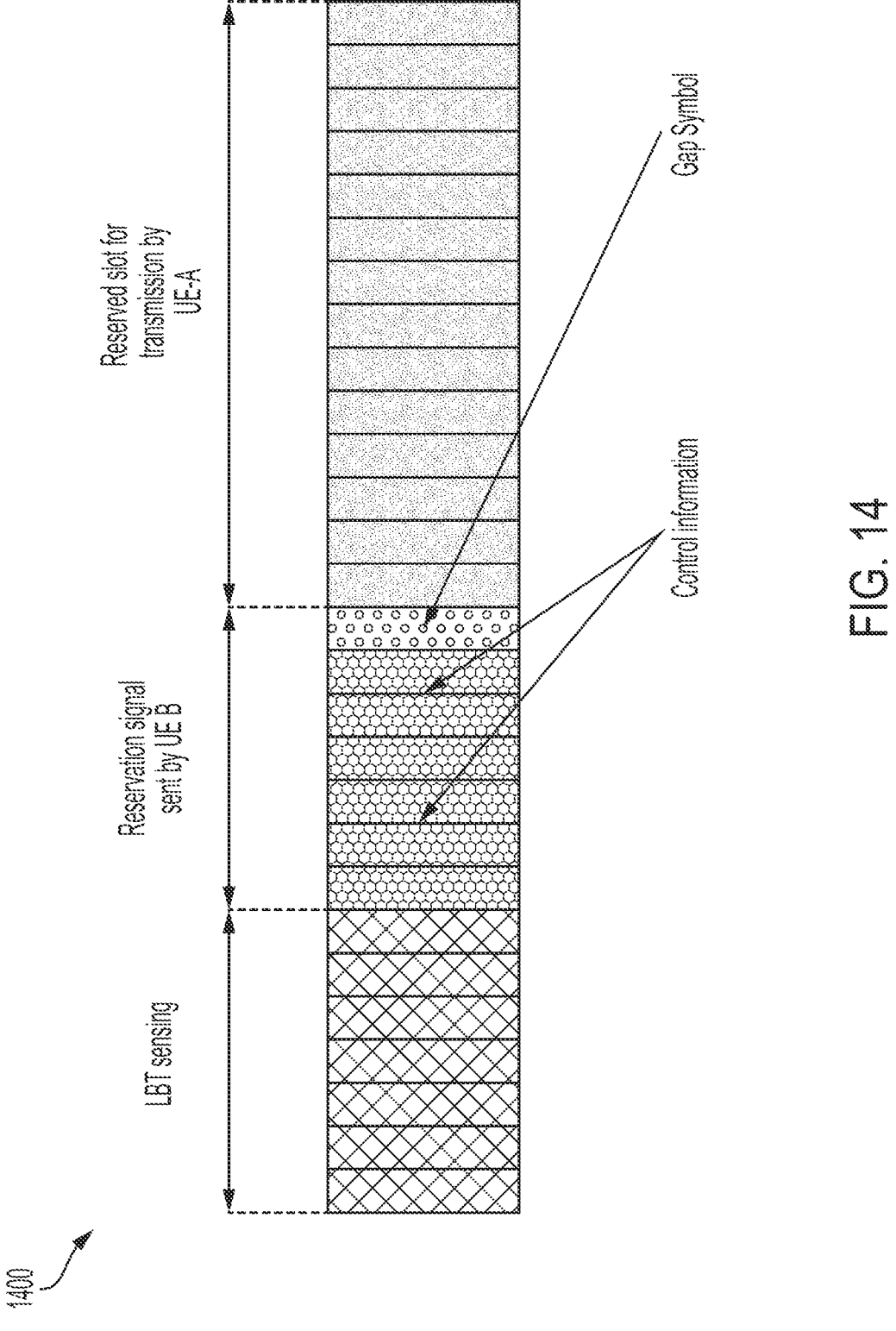
FIG. 14 illustrates an example embodiment of the location of control signaling information within the reservation signal when the reservation signal is occupied with control information, in accordance with the disclosure.

FIG. 14 illustrates an example embodiment 1400 of the location of control signaling information within the reservation signal when the reservation signal is occupied with control information, in accordance with the disclosure.

A reservation signal with control signaling in all symbols: for example, the Rx UE may send the control signaling over all the symbols that are covered by the reservation signal (i.e., multiple copies of the reservation signal indication may be sent in each symbol in which the reservation signal is transmitted or a bigger payload may be sent jointly over all symbols). In this case, the Tx UE will attempt to decode the control signal in all symbols and subsequently transmit in slot X when the signal is detected. This may be beneficial (when multiple copies of the reservation signal indication is sent) in the sense that it may allow the Tx UE more time to prepare for its upcoming transmission once it detects the reservation signal indication in any symbol. In some embodiments, the extra processing on the Tx UE side may occur, since it may attempt to process the reservation signal indication in all symbols.

An example of this approach is illustrated in FIG. 14. Indications to different Tx UEs may be provided in different symbols, according to some embodiments. For instance, in symbol 6 the Rx UE may indicate a COT sharing to Tx UE A while in symbol 5 the Rx UE may indicate a conflict and request resource reselection to Tx UE C (to resolve the hidden node problem). In addition, an Rx UE may also indicate a COT sharing to multiple UEs in case of frequency multiplexing of NR UEs. In this case the COT sharing indication may be targeted towards all UEs or it may be targeted towards a specific UE based on its reservation. For instance, when a COT indication is provided in symbol 6 then all the Tx UEs may be allowed to share the COT whereas when the indication is sent in symbol 5 then only a UE with reservation on a specific subchannel (for example, subchannel M) is allowed to do COT sharing.

Figure 15:
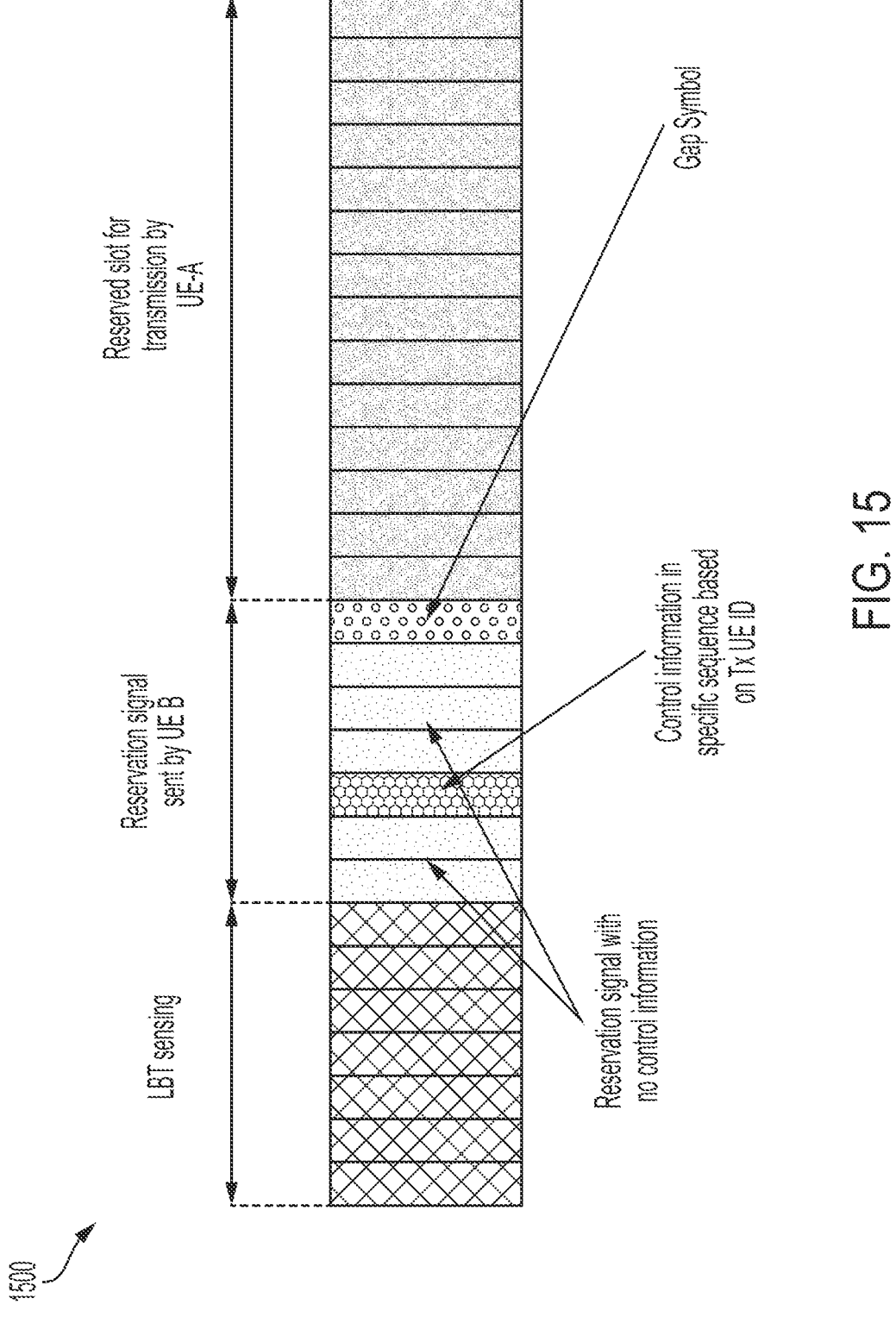
FIG. 15 illustrates an example embodiment of an alternative location of control signaling information within the reservation signal, in accordance with the disclosure.

FIG. 15 illustrates an example embodiment 1500 of an alternative location of control signaling information within the reservation signal, in accordance with the disclosure.

A reservation signal with control signaling in a specific symbol: for example, the Rx UE may send the control signaling over a specific symbol based on either the Tx UE ID or the Rx UE ID or both. An example of this approach is illustrated in FIG. 15. Distinguishing which of the neighboring UEs may be allowed to do the COT sharing in cases wherein there exists multiple transmitters may be noted.

Figure 16:
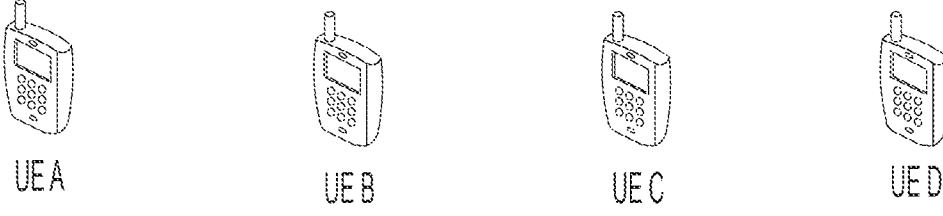
FIG. 16. illustrates avoiding the false triggering of COT sharing to neighboring UEs by sending the control information in specific locations within the reservation signal, in accordance with the disclosure.

FIG. 16. illustrates avoiding the false triggering of COT sharing to neighboring UEs by sending the control information in specific locations within the reservation signal, in accordance with the disclosure. Embodiments using this approach, may allow for time multiplexing of multiple control signaling by multiple UEs and may reduce the chances of false triggering of COT sharing. For example, when UE A is trying to transmit to UE B and UE C is trying to transmit to UE D as shown FIG. 16. Then UE B may acquire the channel on behalf of UE A and provide a reservation signal indication in a symbol based on the UE A ID and thus it may avoid providing a false trigger of COT sharing to UE C, and eventually a collision between the transmissions of UEs A and C.

The selection between the three approaches discussed above for time domain allocation of control signaling within the reservation signal may be pre-configured per resource pool. In some embodiments, the control signaling sent within the reservation signal may occupy one or more symbols based on resource pool configuration. Further, in some embodiments, the selection of the symbol over which to send the control signaling within the reservation signal may be dependent on the Tx or Rx UE IDs or the subchannels used for the transmission.

Frequency Domain Allocation of Control Signaling in the Reservation Signal

Figure 17:
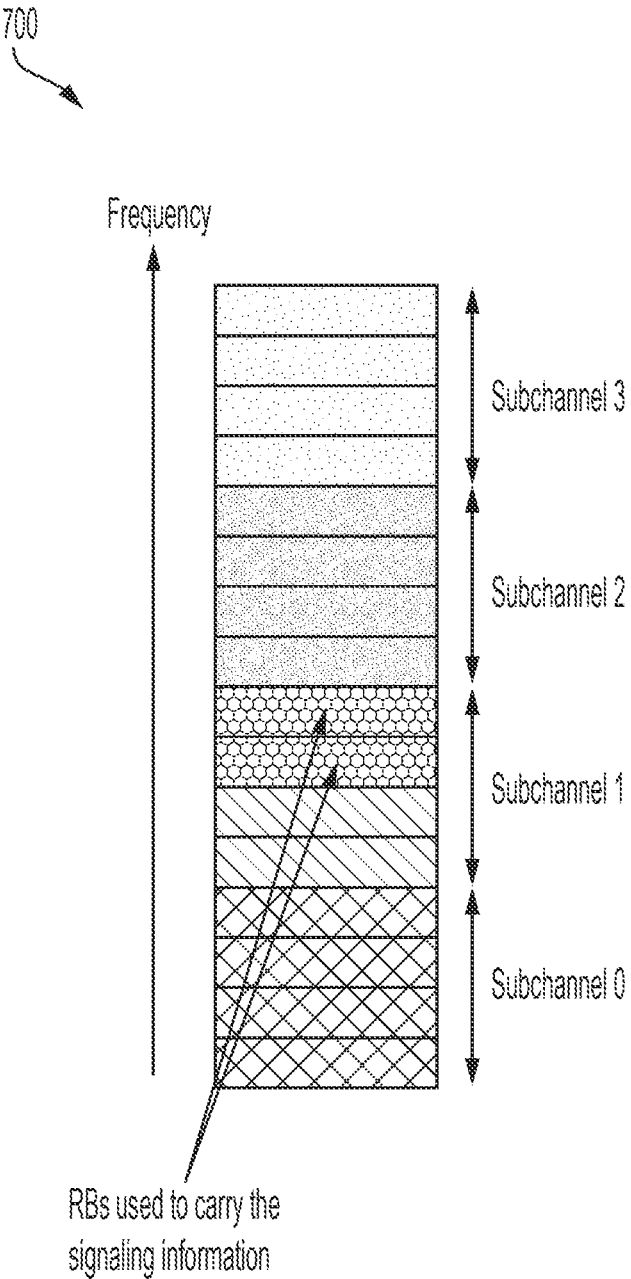
FIG. 17 illustrates an example embodiment of the frequency domain location of the control signaling within the reservation signal, in accordance with the disclosure.

FIG. 17 illustrates an example embodiment 1700 of the frequency domain location of the control signaling within the reservation signal, in accordance with the disclosure.

A reservation signal with control signaling in a specific subchannel: in some embodiments, the Rx UE may use a specific subchannel to transmit the control signaling. In addition, the Rx UE may also select a subset of the RBs within the subchannel to transmit the control signaling to the Tx UE. The selection of the subchannel/RBs may be either dependent on the Tx UE ID or the Rx UE ID or both. It may also be dependent on the subchannels reserved by the Tx UE for the transmission. In this case, a limited control signal payload may be carried due to the limited RBs used for the transmission (for example, when the control signaling is mapped to only one PRB then the control payload may be limited). However, collisions between reservation signals transmitted by neighboring Rx UEs may be easily distinguishable by the Tx UE. An example of this approach is illustrated in FIG. 17 wherein a UE selects only two RBs within a specific subchannel to send its control signaling (The selected RBs are shown to be adjacent however they may also be interlaced). The separation of control signaling of different UEs in the frequency domain based on their IDs also may limit the chances of false triggering of COT sharing as mentioned above. Further, in some embodiments, an interlacing structure may also be considered to meet the OCB requirement for operation in unlicensed band. In particular, the selected RBs may be separated in frequency in order to fill the unlicensed channel.

A reservation signal with control signaling in all subchannels: according to some embodiments, the Rx UE may use all the subchannels over which the reservation signal is transmitted to indicate the control signaling. This is beneficial in two aspects. First, it may allow the NR UE to transmit over a large number of RBs and thus a large control signaling payload may be sent. Second, it may also allow the NR UE to send multiple copies of the control signaling over multiple subchannels to benefit from frequency diversity. It also may result in collisions between NR UEs that simultaneously perform the reservation, as their control signaling may be overlapping. For example, in case of a groupcast, multiple NR UEs may be simultaneously assisting the Tx UE in the LBT sensing. Subsequently, when two of these UEs simultaneously succeed in their LBT and send the control signaling indication over all the RBs then there may be a collision between the control signaling. However, this case is unlikely to occur.

Further, according to some embodiments, the selection between the two approaches discussed above for frequency domain allocation of control signaling within the reservation signal may be pre-configured per resource pool.

In some embodiments, the control signaling sent within the reservation signal may occupy one or more RBs/subchannels based on resource pool configuration. Further, according to some embodiments, the RBs occupied by the control signaling may be interlaced to meet the OCB requirement for unlicensed operation. In yet additional embodiments, the control signaling of multiple UEs may be frequency multiplexed within the reservation signal by using different RBs/subchannels (for example, sending COT sharing to one Tx UE and conflict indication to another Tx UE). According to some embodiments, the selected RBs/subchannels to carry the control signaling information may be dependent on the Tx UE ID or the Rx UE ID or both.

Structure of Control Signaling within the Reservation Signal

Exemplary embodiments for the structure of the control signaling may include:

A PSFCH-like approach: According to some embodiments, control signaling may be carried by one or more ZC sequences that are sent in one or more PRBs/symbols as discussed above. According to this embodiment, the control signaling payload may be limited to reduce the processing overhead and reduce the complexity of the LBT sharing approach. It may also reduce the processing latency used by the Tx UE which may reduce the overhead and increase the resource utilization efficiency. When a Tx UE reserved slot X for its future transmission and is used to decode only 1 or 2 ZC sequences to obtain the control information from the assisting Rx UE, then this control information may be sent up to slot X-1 thus minimizing the duration of the control signaling (i.e., it may help in saving power and resources because the UE may trigger its LBT sensing at a later point in time). In this case, a UE may send a specific ZC sequence in a specific symbol and in a specific RB with a specific cyclic shift to indicate the COT sharing opportunity and allow the Tx UE to perform the transmission. It may also use a different ZC sequence or a different RB to trigger a reselection at the Tx UE due to the half-duplex constraint when the Rx UE will be using the channel acquisition for its own transmission before sharing it with the Tx UE. The selection of the ZC sequence, the OFDM symbol, and the RB to send the reservation signal indication may be based on the Tx and Rx UE IDs and the selected subchannels for transmission by the Tx UE. In addition, the previous symbol may contain a copy of the actual symbol carrying the control signaling for AGC training.

Figure 18:
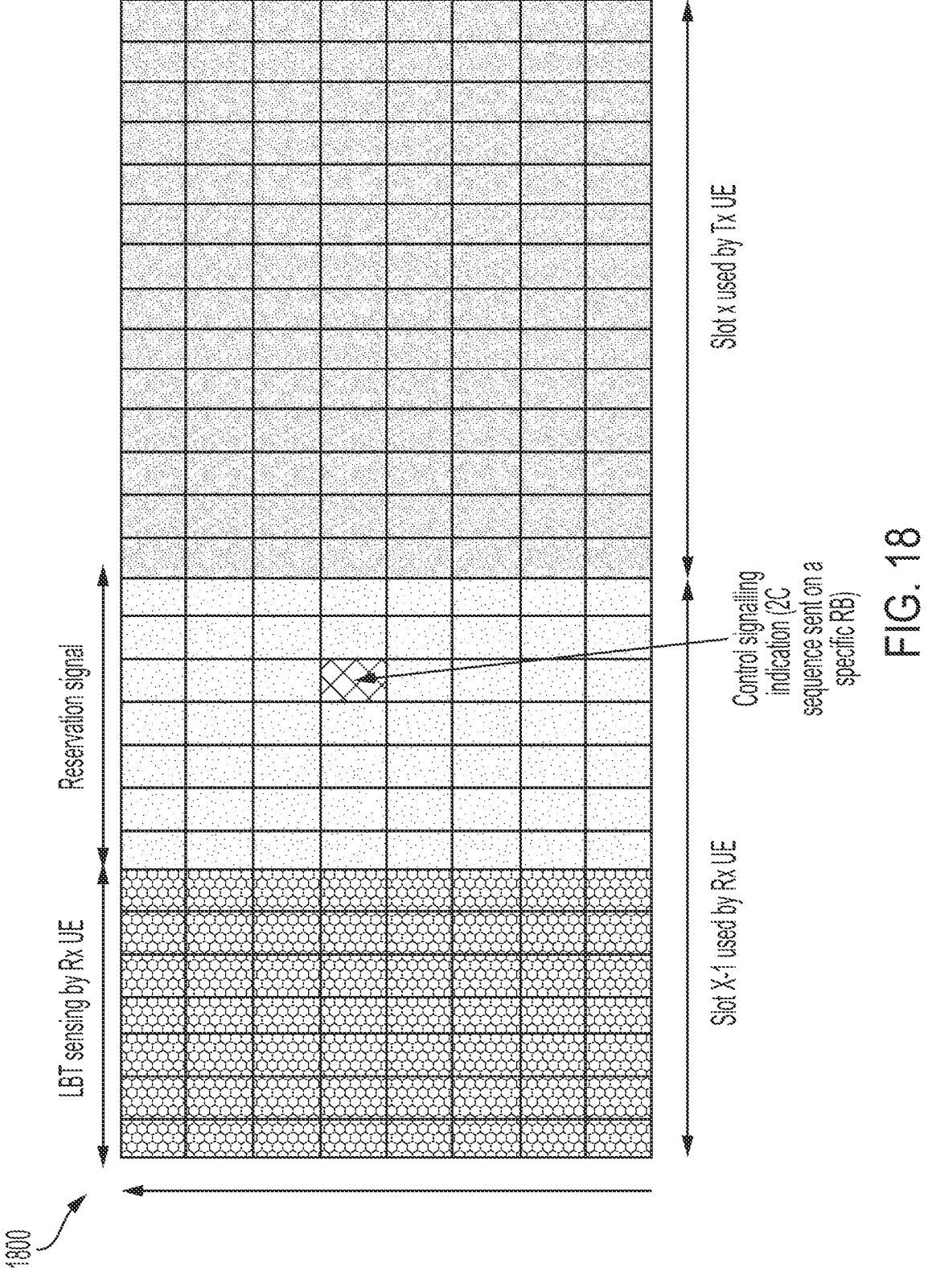
FIG. 18 illustrates an example embodiment 1800 of sequence-based approach for carrying control signaling information within the reservation signal, in accordance with the disclosure.

FIG. 18 illustrates an example embodiment 1800 of sequence-based approach for carrying control signaling information within the reservation signal, in accordance with the disclosure.

A PSCCH-like approach: A larger payload may be carried when compared to the ZC sequence-based approach, according to some embodiments. An Rx UE may prepare an indication of reservation on behalf of the Tx UE along with other control information (for example, request for COT sharing with the Tx UE or resource selection assistance request/information for future transmissions) and send it within the reservation signal. To reduce the processing latency, this control signaling payload may be prepared earlier at the Rx UE and be transmitted only when the channel is acquired after the LBT is successful and only when the number of OFDM symbols within the reservation signal is above a threshold. For example, the PSCCH-like control payload may be sent only when the duration of the reservation signal is above X number of OFDM symbols where X is a parameter that is configured per resource pool.

Figure 19:
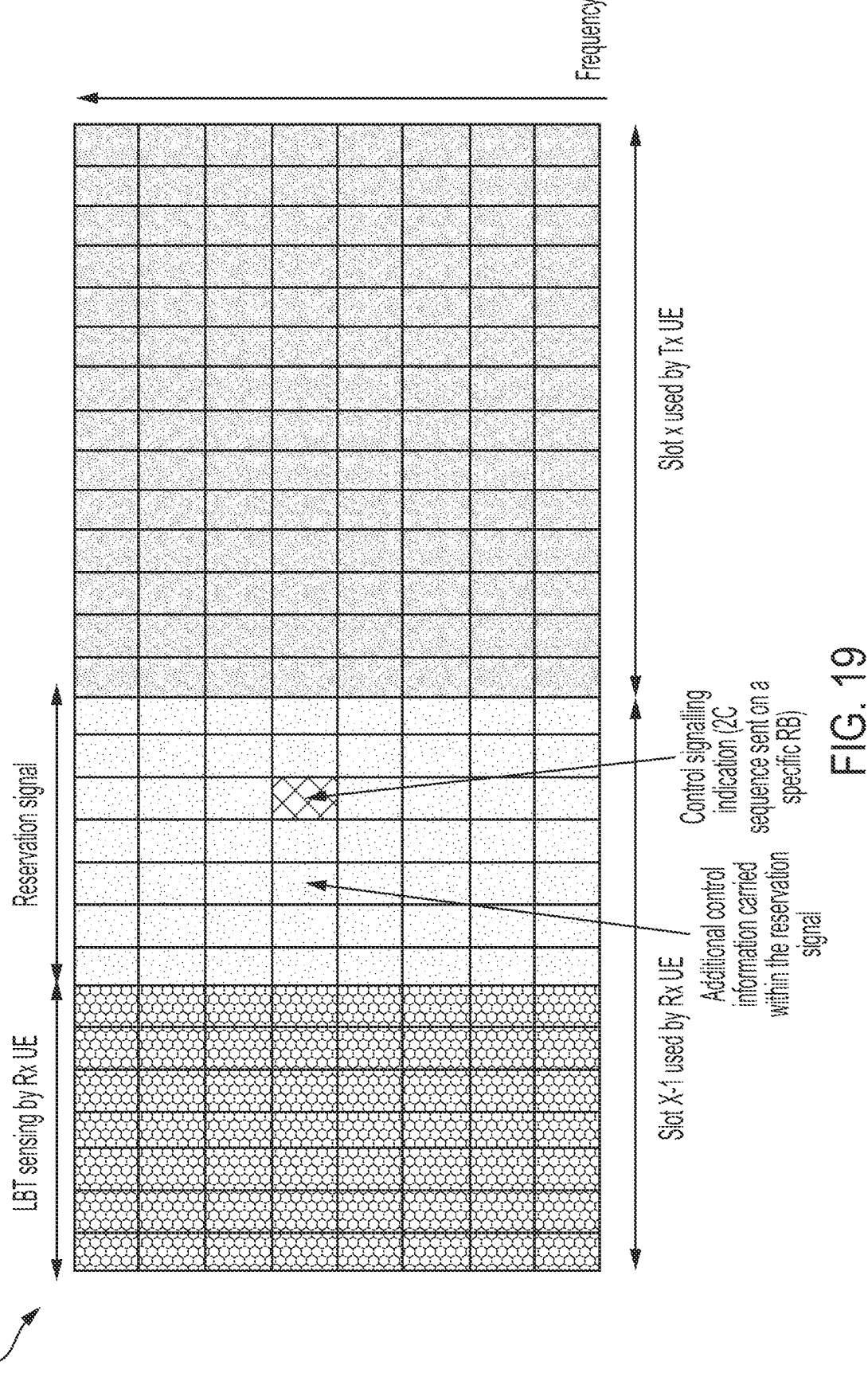
FIG. 19 illustrates an example embodiment of separation of the reservation indication to simplify the processing requirements at the Tx UE, in accordance with the disclosure.

This may also be done by indicating specific starting positions for the control signaling within the reservation signal to reduce the processing complexity of the blind decoding at the Tx UE. This PSCCH-like payload may be sent along with DMRS signaling in one or more symbols within the reservation signal. In addition, the first symbol may be a repetition of the second symbol for AGC training. However, the processing time requirement at the Tx UE may increase. Once the Tx UE obtains the control information, it may decode it which might result in latency and thus the Tx UE might not be able to send in the reserved slot. To address this, two options may be considered as follows:

The Rx UE may separate the reservation indication and send it by using a PSFCH-like approach (i.e., by using a ZC sequence in a specific RB). This may simplify the decoding process and may be considered as a hybrid-approach that combines the above two approaches. This approach is illustrated in FIG. 19. FIG. 19 illustrates an example embodiment 1900 of separation of the reservation indication to simplify the processing requirements at the Tx UE, in accordance with the disclosure.

Figure 20:
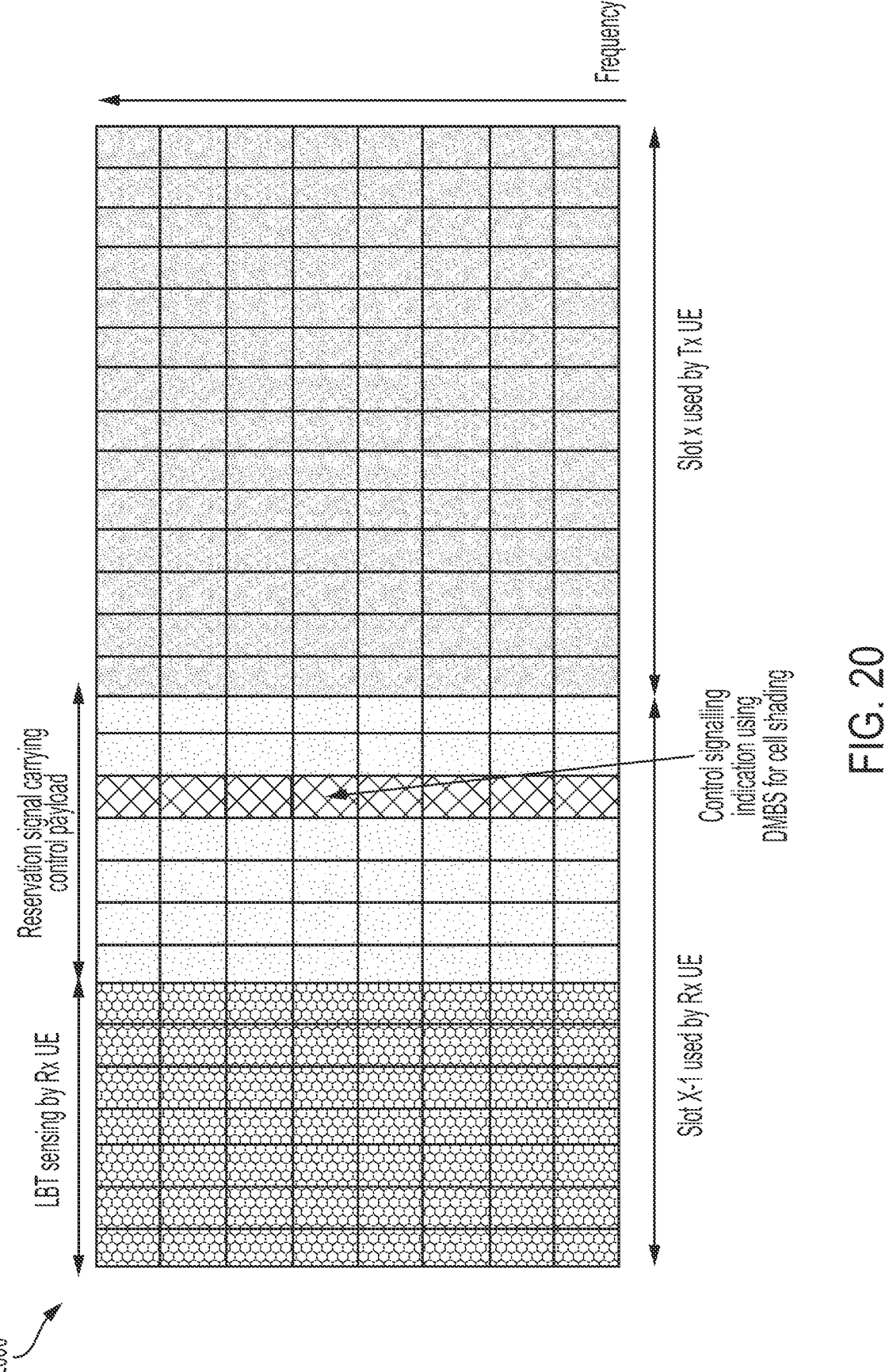
FIG. 20 illustrates an example embodiment of the control signaling indication for COT sharing which may be carried using the DMRS (for example, by using a specific DMRS sequence), in accordance with the disclosure.

The Rx UE may provide the reservation indication separately by using the DMRS embedded within the control signaling. For example, when an Rx UE uses a specific DMRS sequence, the Tx UE may detect the COT sharing indication provided by the Rx UE and accordingly it may start to send its payload immediately in its intended slot. The selected DMRS sequence for COT sharing may be configured per resource pool. An example of this approach is illustrated in FIG. 20. FIG. 20 illustrates an example embodiment of the control signaling indication for COT sharing which may be carried using the DMRS 2000 (for example, by using a specific DMRS sequence), in accordance with the disclosure.

In some embodiments, the control signaling indicating COT sharing may be carried by using a ZC sequence to simplify the processing requirements at the Tx UE.

In additional embodiments, the selected resource (i.e., the RB, OFDM symbol, ZC cyclic shift) used to carry the COT sharing indication may be dependent on the Tx or Rx UE IDs or the selected subchannel by the Tx UE or both.

In some embodiments, the transmission of the COT sharing indication may be repeated in the frequency domain to meet the OCB requirement of unlicensed operation (for example, by using an interlaced RB structure), in accordance with the disclosure. In additional embodiments, the transmission of the COT sharing indication may be repeated in the time domain to allow for AGC training. In some embodiments, a PSCCH-like approach may be used to send additional control signaling within the reservation signal (in the resources not occupied by data when any).

In further embodiments, to reduce the processing complexity at the Tx UE the indication of COT sharing may be separated from the additional control signaling (for example, by using a ZC sequence for the COT sharing indication similar to the PSFCH/PSCCH approach in NR Rel-16 sidelink), in accordance with the disclosure. In some embodiments, to reduce the processing complexity at the Tx UE the indication of COT sharing may be carried in the used DMRS sequence that is sent within the PSCCH-like payload. In yet further embodiments, to reduce the processing complexity at the Rx UE, the PSCCH-like payload may be prepared beforehand and be sent only when the LBT is successful and the reservation signal occupies a large enough number of OFDM symbols.

Frequency Multiplexing of NR UEs within the Unlicensed Band

Figure 21:
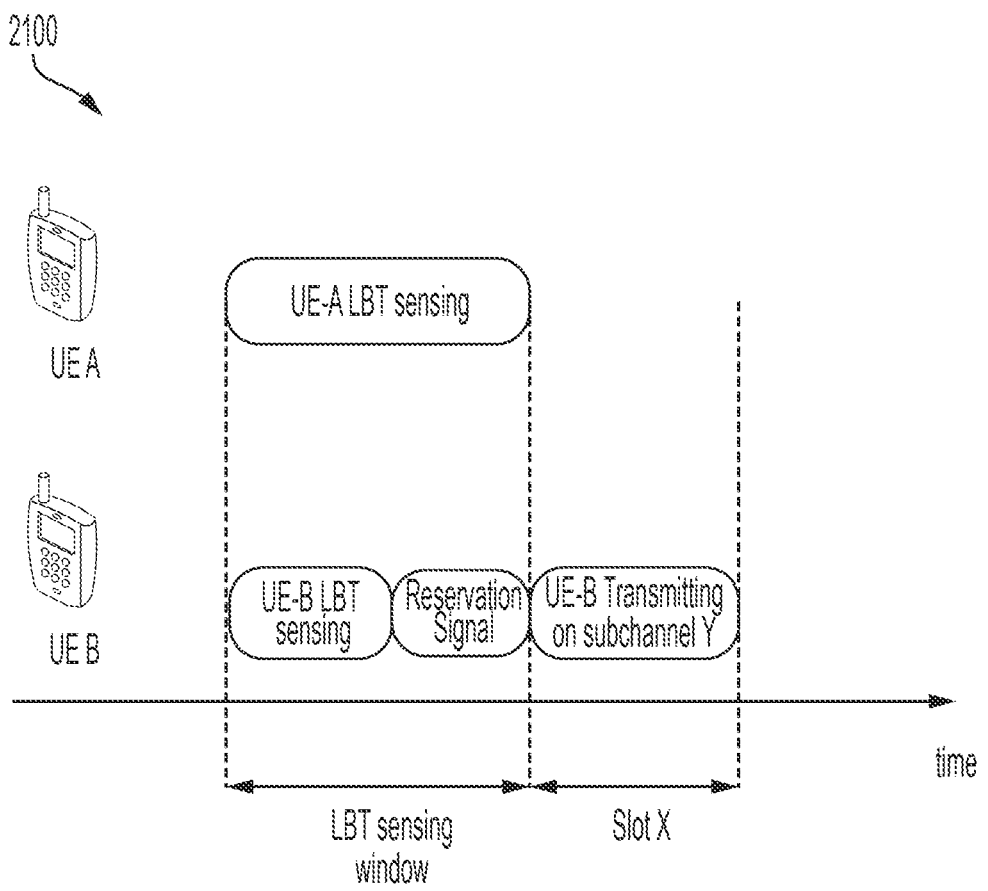
FIG. 21 illustrates an example embodiment of two NR UEs with future reservations in slot X performing LBT sensing before transmitting, in accordance with the disclosure.

FIG. 21 illustrates an example embodiment 2100 of two NR UEs with future reservations in slot X performing LBT sensing before transmitting, in accordance with the disclosure. In some embodiments, when an NR UE plans to perform a transmission on the unlicensed band, it may be expected to perform LBT and limit its access to the channel when it is declared as unoccupied based on its energy sensing results. This constraint may restrict the ability of NR UEs to multiplex their reservations in the frequency domain. For example, when two NR UEs select a future slot X for their upcoming transmission but in different subchannels, these two UEs may perform LBT before slot X to declare the channel as unoccupied before performing their transmissions. Both of them may select a random number of slots within their contention window size and attempt to perform sensing until the channel may be detected as unoccupied before transmitting as discussed in in embodiments disclosed herein.

When one of the UEs manages to clear its LBT sensing before the other, it may be expected that the UE will send a reservation signal followed by its actual transmission at slot X. Subsequently, the other UE may detect the channel as occupied and may not be able to clear its LBT and accordingly it will refrain from transmitting as illustrated in FIG. 21. In FIG. 21, UE-A and UE-B have a future reservation in slot X but in different subchannels (for example, subchannel Y for UE B and subchannel Z for UE A). as illustrated, before slot X, both UEs may perform LBT sensing but only UE B was successful. Subsequently, UE A refrains from transmitting on slot X whereas UE B performs its transmission on subchannel Yin slot X.

Figure 22:
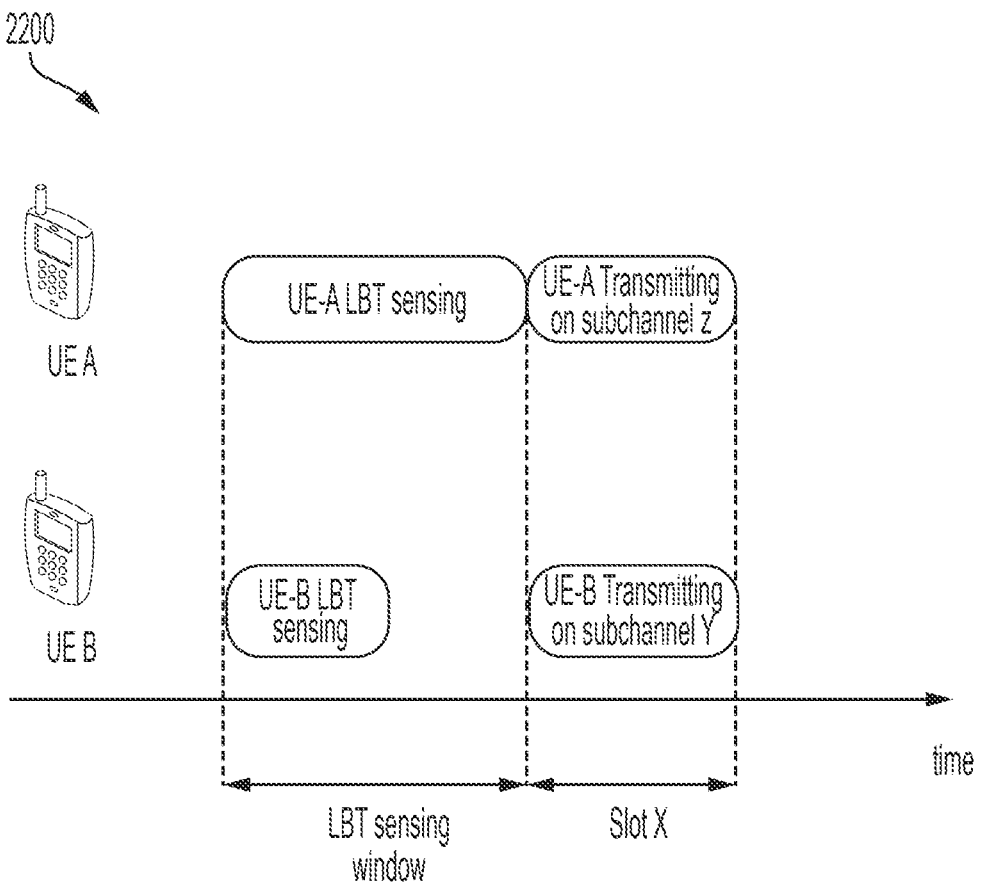
FIG. 22 illustrates an example embodiment of when NR UEs may not send a reservation signal after LBT success, but rather wait and transmit only when their future reserved slot starts, in accordance with the disclosure.

FIG. 22 illustrates an example embodiment 2200 of when NR UEs may not send a reservation signal after LBT success, but rather wait and transmit only when their future reserved slot starts, in accordance with the disclosure. In this case, although subchannel Z was not used, still UE A may not be able to transmit. This is due to the fact that the NR UE may not decide whether the channel is occupied by NR UE B or a different device (for example, a WiFi device). In other words, both NR UEs will be able to transmit simultaneously (i.e., perform the frequency multiplexing) when they are able to declare the channel as clear at the same instant. However, this may be unlikely. To address this, according to some embodiments, the NR UEs may not perform the transmission immediately after clearing their LBT, but rather may wait until their future reserved slot boundary. In this case, all neighboring UEs that were able to clear their LBTs may be able to start their transmissions simultaneously at the future reserved slot as illustrated in FIG. 22.

Despite this approach, another device (for example, a WiFi device) may be performing its LBT sensing simultaneously with the NR UEs and accordingly, the other device may use the channel before the NR UEs since it may not wait until the slot boundary.

In some embodiments, a similar concept to the one described above, may be relied upon. The concept of reservation signal as discussed above, was used to allow Rx UE(s) to assist the Tx UE in acquiring the channel. This may be done by allowing the Rx UE(s) to perform the LBT along with the Tx UE and accordingly indicate the channel acquisition to the Tx UE. A similar approach may also be considered to enable the frequency multiplexing between NR UEs in the unlicensed band. An NR UE may use the reservation signal, for example, to indicate that the channel is occupied by NR UEs. This may be done by sending a special indication in the control signaling embedded within the reservation signal. In this case the reservation signal sent may serve the following purposes:

Blocking the channel for non NR UEs: since the reservation signal may occupy the channel, the neighboring devices (for example, WiFi devices) may detect the channel occupancy and accordingly defer their intended transmissions.

Indicating the channel sharing to NR UEs (based on resource pool configuration): since the channel may be considered as occupied by an NR UE, then neighboring NR UEs may refer to their sensed NR reservations (i.e., their Mode 2 sensing information) to identify the exact subchannels that will be occupied by the NR UEs in future slots and accordingly perform their transmission. For instance, when an NR UE detected that subchannels 2 and 3 of slot X are reserved by NR UEs then it may refrain from transmitting on these subchannels but still it will be able to access other subchannels (for example, subchannel 1) and perform its transmission when the slot is considered occupied by an NR UE (as indicated by the reservation signal). Once the LBT is declared as cleared by an NR UE for a slot X, then resource reservation rules (for example, the Mode 2 resource reservation procedure) of NR UEs may come into effect and accordingly the resources may be shared. All UEs sharing the spectrum may abide with the PSD constraints of the unlicensed spectrum.

In some embodiments, it may be noted that when the resource pool configuration does not allow the frequency multiplexing between NR UEs, then NR UEs may not be allowed to select subchannels in slots occupied by other UEs. This may be easily done by either of the following:

In some embodiments, the number of subchannels may be fixed to the total number of available subchannels when performing the Mode 2 resource selection procedure.

In further embodiments, the Mode 2 resource selection procedure (i.e., Step 6) may be updated to consider that all received reservations from neighboring UEs occupy the complete bandwidth.

Yet, in additional embodiments, the disabling of frequency multiplexing of NR UEs may also be limited to specific UEs with low priority TBs. A priority threshold may be configured per resource pools. In this case, NR UEs with priority above this threshold may be allowed to frequency multiplex their transmissions with other NR UEs.

Figure 23:
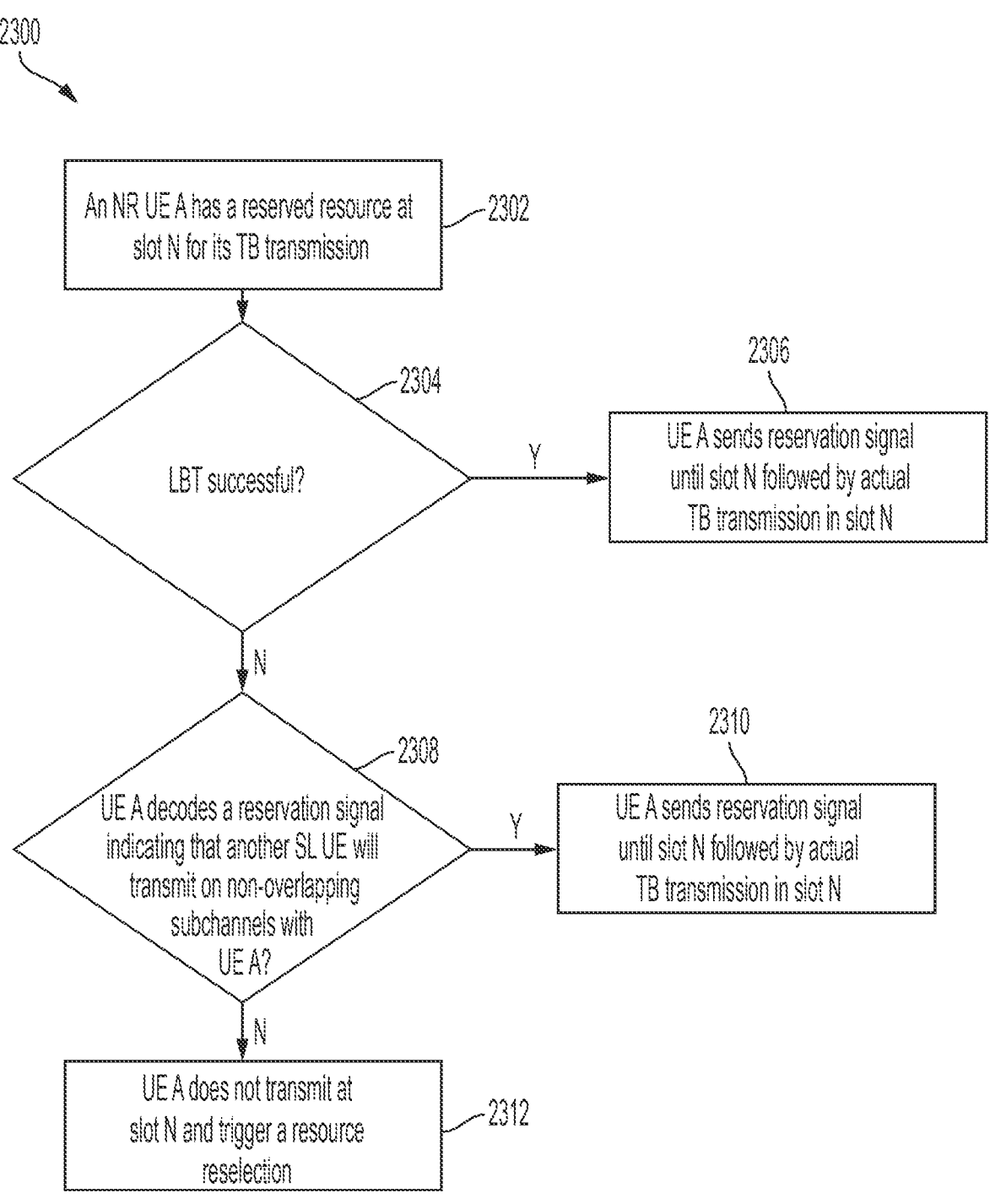
FIG. 23 illustrates an exemplary method of an FDM multiplexing of NR UEs in the unlicensed band in an example embodiment, in accordance with the disclosure.

FIG. 23 illustrates an exemplary method of an FDM multiplexing of NR UEs in the unlicensed band in an example embodiment, in accordance with the disclosure. In block 2302 an NR UE A may have a reserved resource at slot N for its TB transmission. In block 2304 the UE A may determine whether its LBT was successful. When the LBT was successful, the UE A may proceed to block 2306. In block 2306 the UE A may send a reservation signal, until slot N, followed by an actual TB transmission in slot N. When the LBT was unsuccessful the UE A may move to block 2308.

In block 2308 the UE A may decode and determine whether a reservation signal indicating that another SL UE will transmit on non-overlapping subchannels with UE A. When UE A determines that SL UE will transmit on non-overlapping subchannels UE A may move to block 2310 where it sends a reservation signal until slot N, followed by an actual TB transmission in slot N. When UE A determines that SL UE will not transmit on non-overlapping subchannels UE A may move to block 2312 where UE A will not transmit at slot N and trigger a resource reselection.

In some embodiments, to simplify the indication of the channel reservation by an NR UE (i.e., the indication allowing the frequency multiplexing), for example, a sequence-based approach may be considered wherein a specific sequence is sent over one or more RBs within the reservation signal. Once this sequence is detected, then an NR UE may consider the slot as shared and accordingly perform its transmissions. The sequence-based approach may be useful due to the limited time available for the NR UEs for processing. When a PSFCH-based approach may be considered for control signaling, a UE may have enough time to perform the processing of the indication, generate its TB, and be ready for the transmission at the intended future slot.

Alternatively, a PSCCH-like approach may be considered similar to embodiments discussed herein, in which the indication allowing the frequency multiplexing of NR UEs is sent in a separate resource along with other control signaling. In some embodiments, the reservation signal sent by an NR UE after it clears its LBT may be used to indicate to its neighbors that the channel in the upcoming slot is reserved by an NR UE. In further embodiments, when the channel is detected as occupied by an NR UE over the next M slots, then during these M slots, the resource reservation rules of sidelink may be in effect (for example, the Mode 2 resource selection procedure of sidelink). This duration may be treated as a licensed spectrum, according to the disclosure herein.

In some embodiments, the reservation signal sent by an NR UE once its LBT succeeds may serve to blocking the channel for non-NR UEs and/or to indicate the channel sharing to NR UEs. In additional embodiments, the multiplexing of NR UEs within the frequency domain may be enabled/disabled by resource pool configuration. In some embodiments, the indication to allow the frequency multiplexing of NR UEs within the reservation signal may be a ZC sequence sent in a pre-configured RB/OFDM symbol to reduce the processing burden on the NR UEs.

In some embodiments, the indication to allow the frequency multiplexing of NR UEs within the reservation signal may be carried along with other PSCCH-like control payload in the reservation signal.

Collaborative Reservation of SSB Resources in Unlicensed Band

In some embodiments, for the sidelink V2X system to operate properly, NR UEs may be synchronized to the same source such that the slot boundaries are known and common between NR UEs. To achieve this, when in coverage, NR UEs may attempt to synchronize with either the gNB or the GNSS. However, in case of out of coverage, one or more NR UEs may transmit SSBs. These SSBs may be periodic so that they may be scanned by neighboring UEs and accordingly the UEs may form a single synchronization cluster in a given area. In case of licensed spectrum, dedicated resources may be assigned for SSB transmissions to ensure that the UEs transmitting the SSBs do not contend with regular data transmissions. However, this assumption cannot be maintained in unlicensed spectrum. In particular, before transmitting the SSB, an NR UE may perform an LBT and accordingly it might not be able to acquire the channel on time to transmit the periodic SSB. To address this, one possibility is to rely on the concept of the Rx UE assisted LBT that was discussed in Section 4.A.

Figure 24:
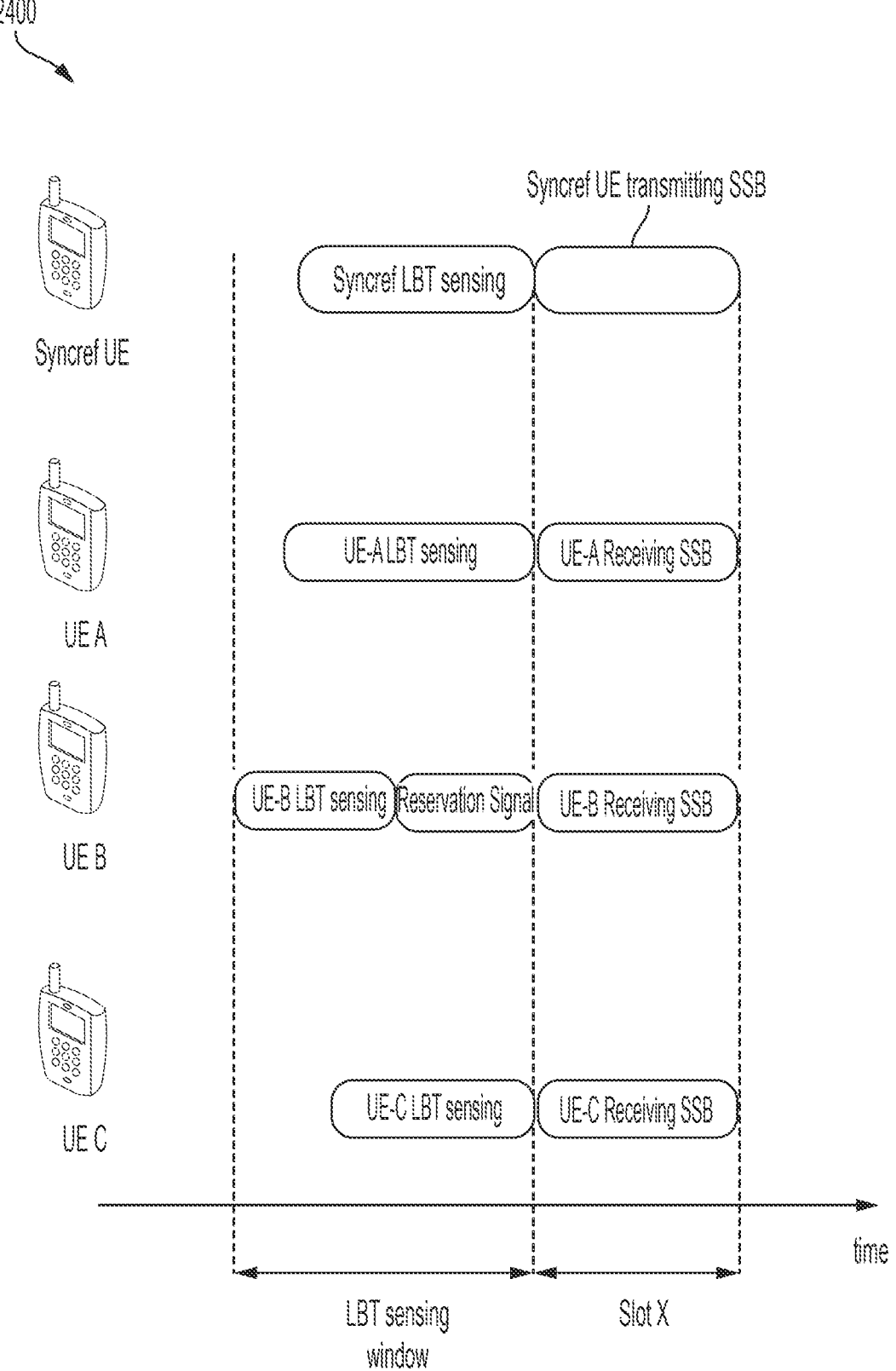
FIG. 24 illustrates Multiple NR UEs assisting the syncref UE in acquiring the channel for sending the Synchronization Signal Block (SSB) in an example embodiment, in accordance with the disclosure.

FIG. 24 illustrates Multiple NR UEs assisting the syncref UE in acquiring the channel for sending the SSB in an example embodiment, in accordance with the disclosure. In this figure, UE-B was the one that was successful in acquiring the channel.

In out of coverage scenarios, only one NR UE may act as a syncref UE in a given location and send the SSB. Subsequently, all neighboring UEs may attempt to synchronize based on this reservation signal. In this case, all NR UEs may be considered as Rx UEs for the SSB transmission. In this case, all UEs that are already synchronized may attempt to perform the LBT before the slot X in which the SSB is expected to be transmitted and accordingly may send a reservation signal as illustrated in FIG. 24.

This reservation signal may include control signaling as discussed above to indicate that this reservation is done on behalf of the UE sending the SSB. Subsequently, the NR UE that was successful in acquiring the channel may yield the channel in Slot X to allow the syncref UE to transmit its SSB. This collaborative LBT approach may not apply to all SSB transmissions. For example, when multiple SSB repetitions are configured per period, the collaborative LBT approach may be limited to a specific subset of the repetitions within an SSB period. It may be limited, for example, only to the essential repetition subset but not for the additional subset of resources that are configured for SSB retransmissions to reduce the burden on the Rx UEs. According to some embodiments, the collaborative approach for LBT sensing and reservation may be enabled or disabled based on resource pool configuration.

In some embodiments, the ability of a syncref NR UE to transmit the SSB in an unlicensed spectrum may be increased by using a collaborative LBT sensing approach. In some embodiments, the NR UEs that are already synchronized may perform LBT sensing before the slot in which the SSB is expected to be transmitted and send a reservation signal with control signaling indicating the COT sharing to the syncref UE. In some embodiments, when an NR syncref UE detects the control signaling indicating the COT sharing, it may consider the channel as unoccupied and perform the transmission of its SSB on the intended future slot. Additionally, according to some embodiments, the ability of NR UEs to assist in LBT sensing for SSB transmissions may be enabled/disabled per resource pool.

Early in Time Transmission with Future Reservation Release

In some embodiments, to transmit in the unlicensed band, NR UEs may perform an LBT operation wherein they sense the channel and only when the channel is empty for a duration equal to their selected LBT sensing duration within their contention window they will be allowed to access the channel and transmit their data (cf. Section 2.A). Due to LBT, there may be no guarantee that the UE will be granted access to the channel.

Figure 25:
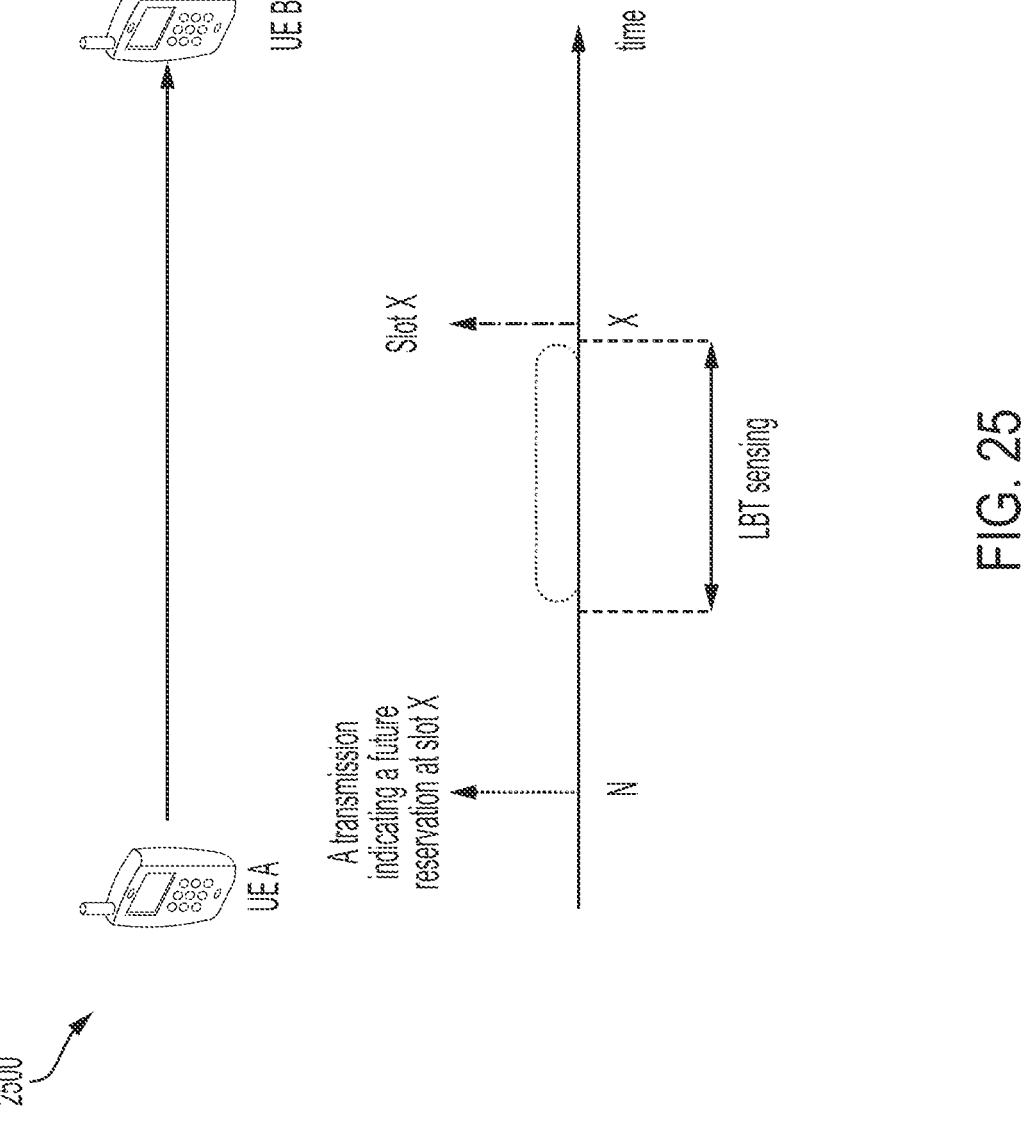
FIG. 25. The LBT sensing duration before a future sidelink transmission in unlicensed band in an example embodiment, in accordance with the disclosure.

FIG. 25. The LBT sensing duration before a future sidelink transmission in unlicensed band in an example embodiment 2500, in accordance with the disclosure. For example, assume that an NR UE A has reserved resource X that is 10 slots away and it plans to transmit data to another UE B as illustrated in FIG. 25. In particular, UE A has used the mode-2 resource procedure to indicate UE B (and other UEs) that it intends to transmit at slot X, thus both UE A and UE B are aware that such a transmission is expected to occur.

In the above example, both the Tx and Rx UEs will be aware of the intended transmission: in the SCI that was sent in slot N, UE A would have included the reservation for a transmission in slot X. Thus, as long as UE B has successfully decoded the SCI, it is aware of the intended transmission of UE A in slot X.

With the current resource allocation procedure, when only the Tx UE performs the LBT and attempts to acquire the channel before the transmission, a few possibilities may occur including:

1) In some embodiments, the Tx UE may acquire the channel just at the slot boundary and accordingly send its data in the intended slot.

2) In some embodiments, the Tx UE may acquire the channel early in time and accordingly send a reservation signal to maintain the channel. To increase the chances of acquiring the channel, an NR UE may benefit when it performs the LBT earlier than its intended slot to increase the chances of its LBT CW counter reaching zero before its intended slot. Subsequently, once its LBT succeeds, it may send a reservation signal to acquire the channel. However, three issues may occur with this approach. First, the reservation signal may not carry any additional information and thus will result in a power and resource wastage. Second, when a UE acquires the channel one or more slots before its intended slot, it may result in low resource utilization efficiency since the NR UE will maintain the channel for a duration longer than it utilizes. Such resources, therefore, may be neither be used by the neighboring NR UEs or by other systems operating in the unlicensed spectrum. Third, it may also result in triggering neighboring UEs to perform reselection because of their LBT failure thus increasing their incurred latency. Therefore, some embodiments reduce the duration of the reservation signal as much as possible.

3) In some embodiments, the Tx UE fails to acquire the channel because the LBT contention window counter did not reach zero before the intended slot for transmission. The UE, therefore, may perform a resource reselection and attempt to find a different resource. In particular, the NR UE may select a later in time resource and perform LBT again which might not be possible for TB transmissions with limited packet delay budgets.

Figure 26:
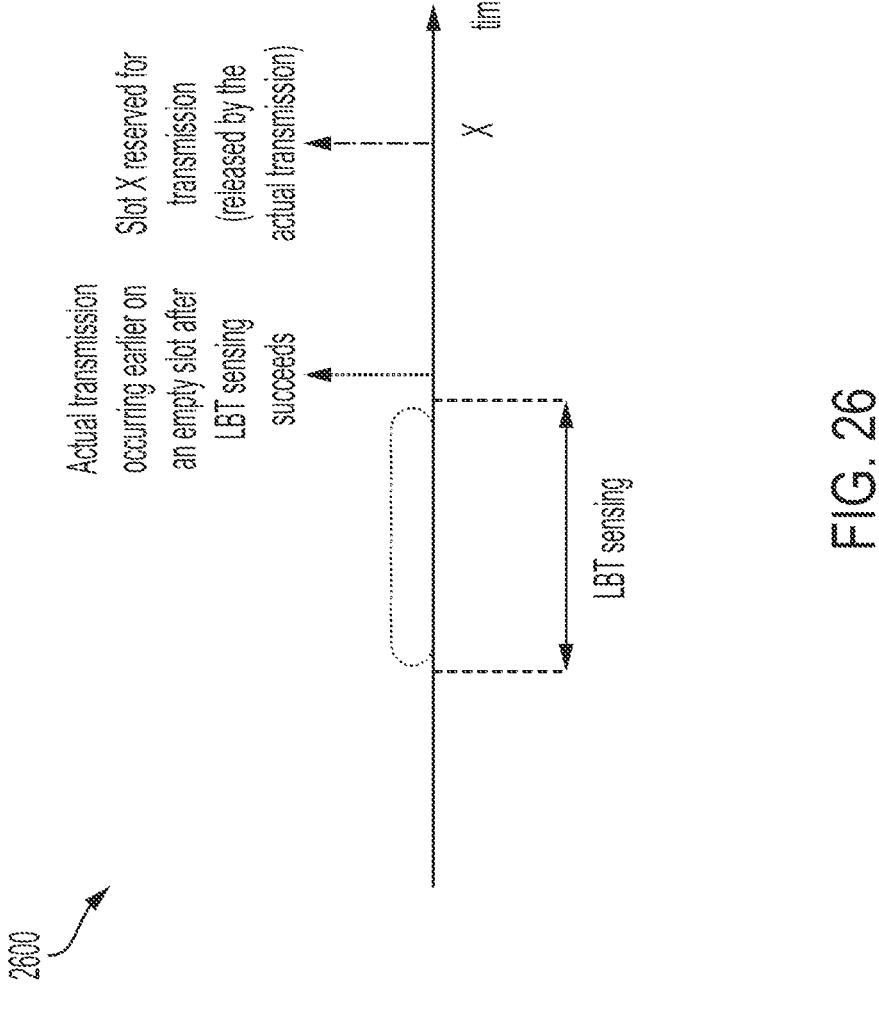
FIG. 26 illustrates the transmission of sidelink payload on an earlier resource after LBT sensing in an example embodiment, in accordance with the disclosure.

FIG. 26 illustrates the transmission of sidelink payload on an earlier resource after LBT sensing in an example embodiment 2600, in accordance with the disclosure. A solution, according to some embodiments, to address the issue of early in time channel acquisition and wasting of resources due to sending only a reservation signal is the early in time transmissions. An NR UE may attempt to acquire the channel early on time only when the earlier slots are not reserved by any other NR UEs. For example, when an NR UE has reserved slot X for transmission, but it found out that slots X-1 and X-2 are not reserved by any other NR UE, it may attempt to perform its LBT at an earlier time slot. Subsequently, when the channel is acquired earlier, the NR UE may perform its intended transmission earlier in time and accordingly release the future reserved resource as illustrated in FIG. 26.

The release of the future reserved resource may be done by $1^{st}$ or $2^{nd}$ stage SCI signaling or it may be carried in a MAC CE. A new field may be added either to the $1^{st}$ or $2^{nd}$ stage SCI or a new MAC CE may be defined to indicate that a future reservation is released by the NR UE. This field may also be limited only when the NR UE is operating in an unlicensed band. For example, a new one-bit field in the $1^{st}$ or $2^{nd}$ stage SCI may be added for releasing a future reservation. When this bit is set, then for example, the next resource indicated by the TRIV and FRIV and period fields may be considered as released. Alternatively, or additionally, one or more fields of the $1^{st}$ or $2^{nd}$ stage may be used to provide an implicit indication of a future resource by setting them to pre-defined value that is configured per resource pool. This configuration may also be limited to the case of unlicensed operation (for example, by using a new $2^{nd}$ stage SCI format that is limited to the unlicensed case or by setting the CSI request field in the $2^{nd}$ stage SCI or by using a reserved HARQ process ID). The future resource that is being released, may be either indicated by the TRIV/FRIV fields in the $1^{st}$ stage SCI or the release may be based on the next upcoming resource regardless of its time/frequency location. In addition, more detailed information about the released resource may be provided as well to specify which of the future resources are being released (i.e., only the first upcoming reservation or future ones as well that are indicated by the TRIV when the TRIV is used to indicate two future reservations). This may be beneficial in maintaining the chain integrity (i.e., the reservation of future resources) especially in scenarios wherein one SCI is not decoded correctly.

Figure 27:
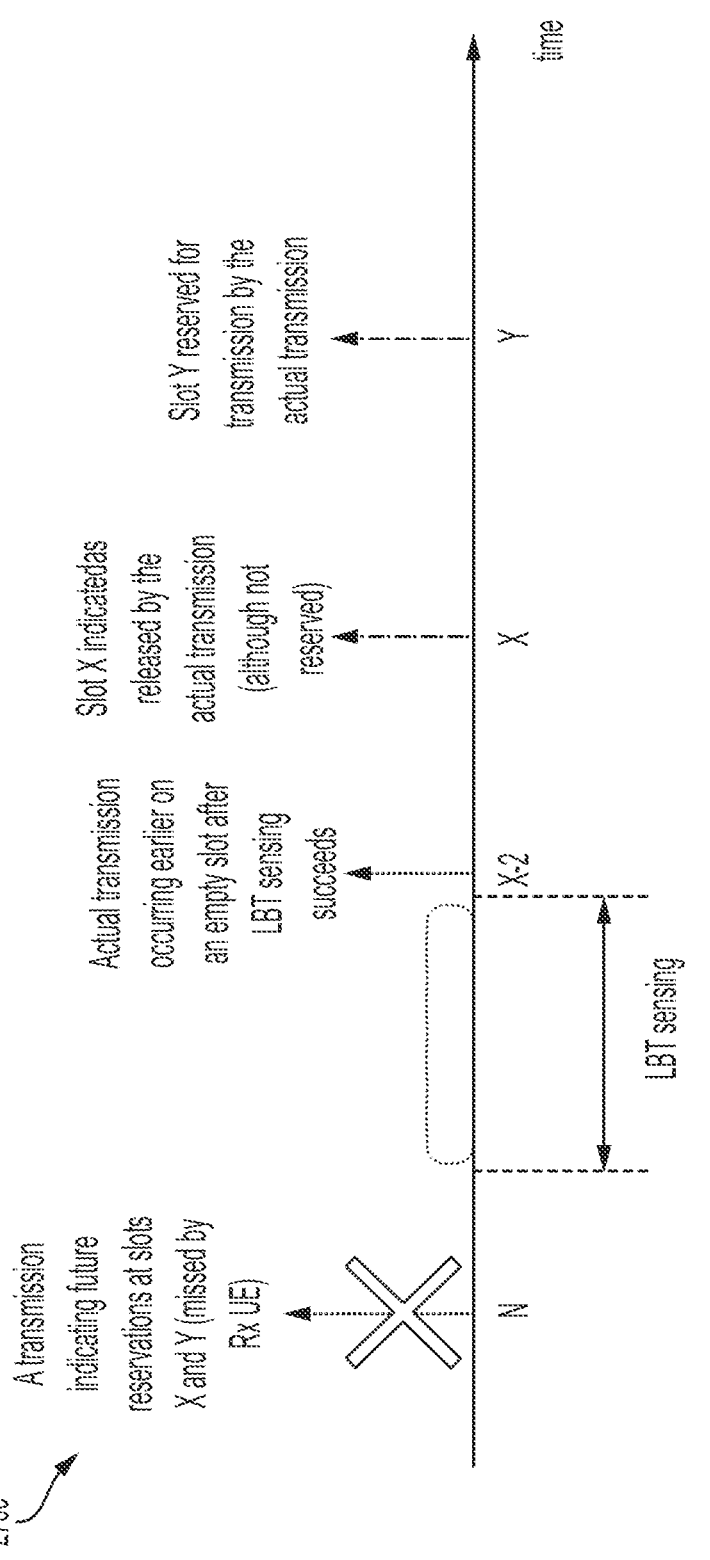
FIG. 27 illustrates how the actual early in time transmission may simultaneously carry a release signal for a future reservation and a reservation for another future resource in an example embodiment, in accordance with the disclosure.

FIG. 27 illustrates how the actual early in time transmission may simultaneously carry a release signal for a future reservation and a reservation for another future resource in an example embodiment 2700, in accordance with the disclosure. For example, assume an NR UE performed a transmission at slot N reserving resources at future slots X and Y as shown in FIG. 27. However, this SCI was not decoded by the Rx UE due to interference. Subsequently, it decided to send at a slot X-2 early in time due to LBT success and accordingly it will cancel the resource at slot X. However, it may still indicate the reservation in slot Y in case the future reservation at slot N was not correctly decoded. This may be simply done by adding a two-bit field in the $1^{st}$ or $2^{nd}$ stage SCI to indicate which of the resources indicated by the TRIV/FRIV fields is maintained and which one is cancelled.

Finally, the resource release signal may also be limited to cases wherein the earlier in time resources are sufficiently earlier than the reserved future resource to allow for Rx processing. When the earlier slot and the future reserved resources fall in consecutive slots, then there may not be enough time to allow for Rx processing and thus the release of future reserved resources may not be useful.

In some embodiments, the triggering of the early in time resource selection may be done based on 1) the LBT sensing starting time, 2) the LBT success, and/or 3) the TB priority. For example, for high priority traffic, a UE may be configured to start its LBT early in time (i.e., 2 or more slots before its intended transmission) when the earlier resource was not occupied by any other NR UE. Subsequently, once the LBT succeeds, then the NR UE may perform an early in time transmission (for example, by triggering a quick resource reselection procedure in which it checks when the early in time resources are not occupied) and subsequently release its future reservation(s).

Despite the simplicity of this approach (earlier resource selection and releasing of future reservations), it may result in increasing the possible collisions between neighboring UEs because NR UEs may be attempting to use resources that were not previously reserved thus reducing the effectiveness of the NR Mode 2 resource selection procedure in detecting future reservations and accordingly its ability to avoid collisions.

Figure 28:
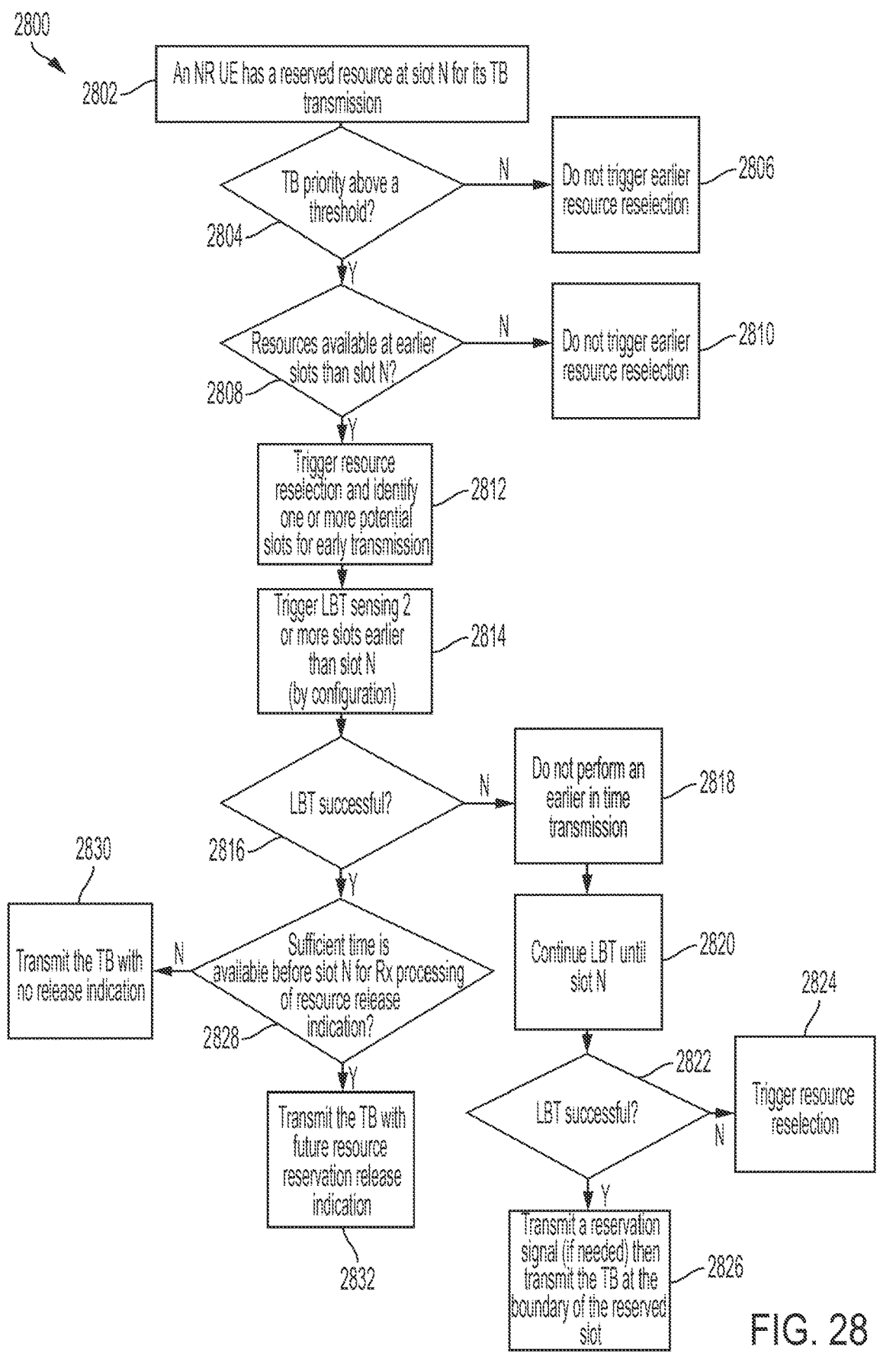
FIG. 28 illustrates an example embodiment of a method of early in time resource reselection with future reservation release, in accordance with the disclosure.

FIG. 28 illustrates an example embodiment of a method 2800 of early in time resource reselection with future reservation release, in accordance with the disclosure. In block 2802 the NR UE may have a reserved resource at slot N for its TB transmission. In block 2804, the UE may check whether the TB priority is above a threshold. When the TB priority is below the threshold method 2800 may proceed to block 2806 where the UE does not trigger an earlier resource reselection. When the TB is above the threshold, the method may proceed to block 2808 where the UE may check whether resources are available at slots earlier than slot N. When resources are not available at earlier slots than slot N the UE may proceed to block 2810 and not trigger earlier resource reselection.

When resources are available at earlier slots than slot N the method 2800 may proceed to block 2812 where the UE may trigger a resource reselection and identify one or more potential slots for early transmission. The method 2800 may then proceed to block 2814 where the UE may trigger LBT sensing, two or more slots earlier than slot N. The method 2800 may then proceed to block 2816 where the UE may verify whether the LBT was successful.

When the LBT is not successful the method 2800 may then proceed to block 2818 where the UE may not perform an earlier in time transmission. Method 2800 may then proceed to block 2820 where the UE may continue LBT until slot N. The method 2800 may then proceed to block 2822 where the UE may verify whether the LBT was successful. When the LBT was unsuccessful the method 2800 may then proceed to block 2824 where it may trigger a resource reselection. When the LBT is successful, method 2800 may then proceed to block 2826 where the UE may transmit a reservation signal, when needed, then transmit the TB at the boundary of the reserved slot.

When the LBT is successful in block 2816, method 2800 may then proceed to block 2828 where the UE may verify whether enough time is available before slot N for Rx processing of resource release indication. When sufficient time is unavailable, method 2800 may then proceed to block 2830 and the UE may transmit the TB with no release indication. When there is sufficient time, the UE may proceed to block 2832 where the UE may transmit the TB with future resource reservation release indication.

In some embodiments, an NR UE may start its LBT sensing much earlier than its intended slot for transmission when the earlier slots are not reserved by NR UEs. In additional embodiments, the starting point in time for the LBT sensing may be dependent on UE transmission priority and the availability of resources at earlier slots that are not occupied by NR UEs. In further embodiments, an NR UE may perform its transmission on earlier non-reserved resources in case the LBT succeeds while providing an indication of a release of a future reserved resource.

In some embodiments, an Indication to release a future resource may be carried either explicitly (by adding a new field) or implicitly (by setting one or more fields to pre-defined values) in the $1^{st}$ or $2^{nd}$ stage SCI or by using a MAC CE. In further embodiments, the implicit or explicit indication of a future resource release may also be limited to the unlicensed band operation. For example, an additional 1-bit field used to indicate a release of a future resource release may be added to the SCI only when the resource pool is configured in an unlicensed band. Similarly, the implicit indication by using pre-configured values in the $1^{st}$ or $2^{nd}$ stage SCI may also be limited to the unlicensed operation. Additionally, in some embodiments, the indication to release a future reservation may be targeted to a specific future resource by using the TRIV/FRIV fields in the $1^{st}$ stage SCI or it may target the first upcoming reservation regardless of its time/frequency resource for simplicity.

Non-Contiguous Reservation Signal for Power Saving

As discussed above, in some embodiments an NR UE might prefer to send a reservation signal when transmitting in the unlicensed band when its LBT was successful and accordingly the UE acquires the channel before the beginning of slot boundary. This reservation signal may be utilized to carry additional information including:

Control signaling to facilitate COT sharing between Tx and Rx UEs.

Control signaling to enable the frequency multiplexing of NR UEs transmissions.

Data (for example, a small TB).

Figure 29:
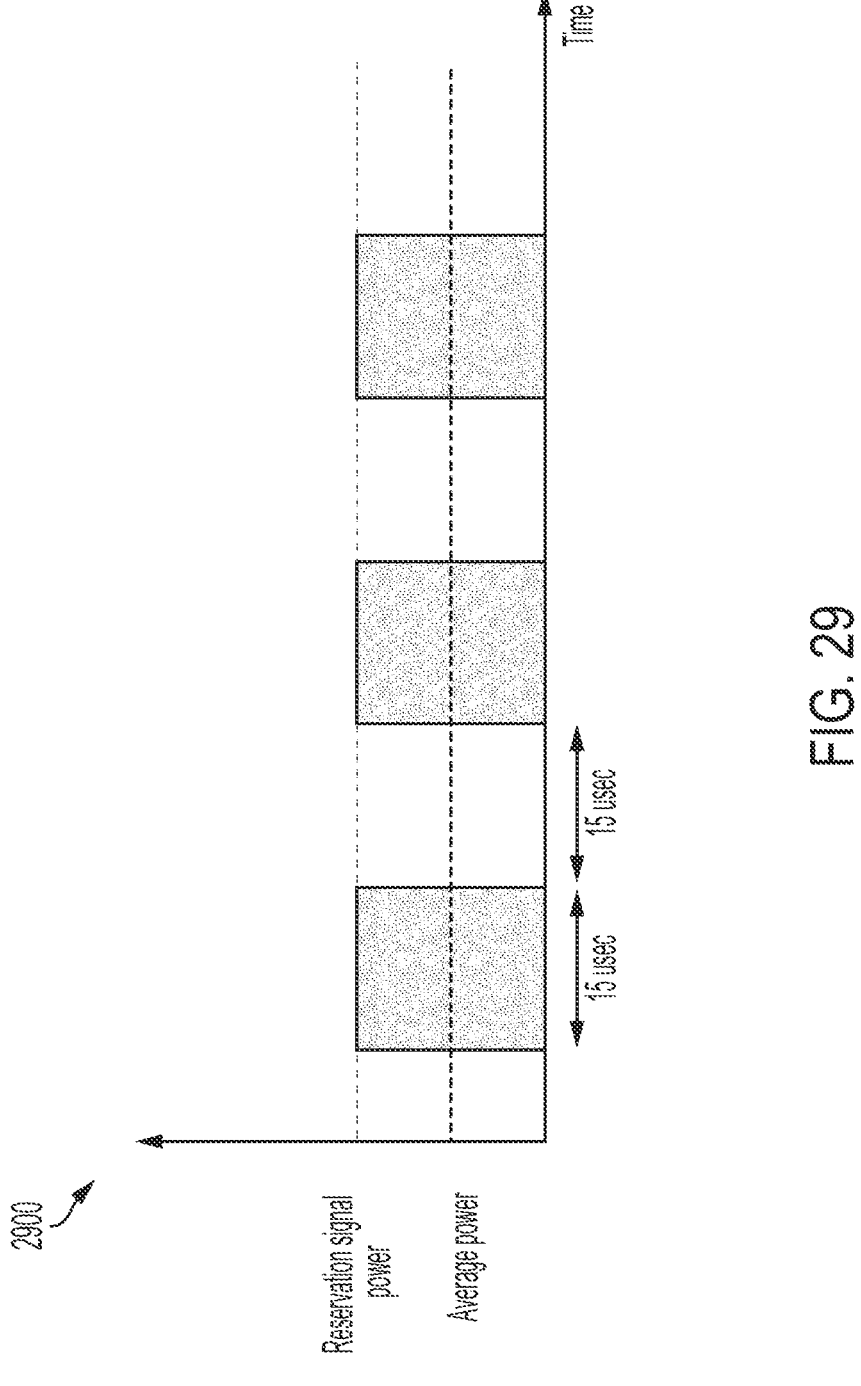
FIG. 29 illustrates an example embodiment of a channel reservation signal with 50% duty cycle.

FIG. 29 illustrates an example embodiment of a channel reservation signal with 50% duty cycle. To reduce the complexity and processing requirements of NR UEs, the reservation signal may carry only a power signal to maintain the channel reservation without any control or data. In this case, the transmitted power may be wasted since it does not carry any useful information to the Rx UE. To address this, some embodiments may rely on a non-contiguous transmission of the reservation signal wherein the UE oscillates between two states. In the first state the NR UE may be transmitting the reservation signal whereas in the second state the UE may be in a Tx off mode with no transmission. To maintain the channel, a UE may not have a gap without any transmissions that is longer than 16 usec. Subsequently, it may have a punctured reservation signal design wherein it transmits a power reservation signal for a duration of 15 usec then enters a Tx off state in the following 15 usec as illustrated in FIG. 29.

In this case, it may maintain the channel reservation while saving power. For example, the NR UE may send a reservation signal with a duty cycle <100% to reduce the power consumption while still preserving the channel. This power saving may not be achieved by reducing the transmit power level of the Tx UE. This is because the latter will result in the reservation signal not being detected by relatively far UEs and thus the channel might be reused resulting in interference. In contrast, methods described herein, according to some embodiments, allow the NR UE to transmit the reservation signal with high power to maintain the channel while still saving power. In some embodiments the duty cycle used by the NR UEs (for example, the durations of the on and the off states) may be configured per resource pool per priority level. This allows a tradeoff between the power saving and the probability of the NR UE maintaining the channel reservation.

In some embodiments, to preserve power, the reservation signal may be sent with a duty cycle less than 100% to reduce the average power consumed by the transmission and still maintain the channel reservation. In further embodiments, the duty cycle used for channel reservation may be configured per resource pool and may be dependent on priority.

Figure 30:
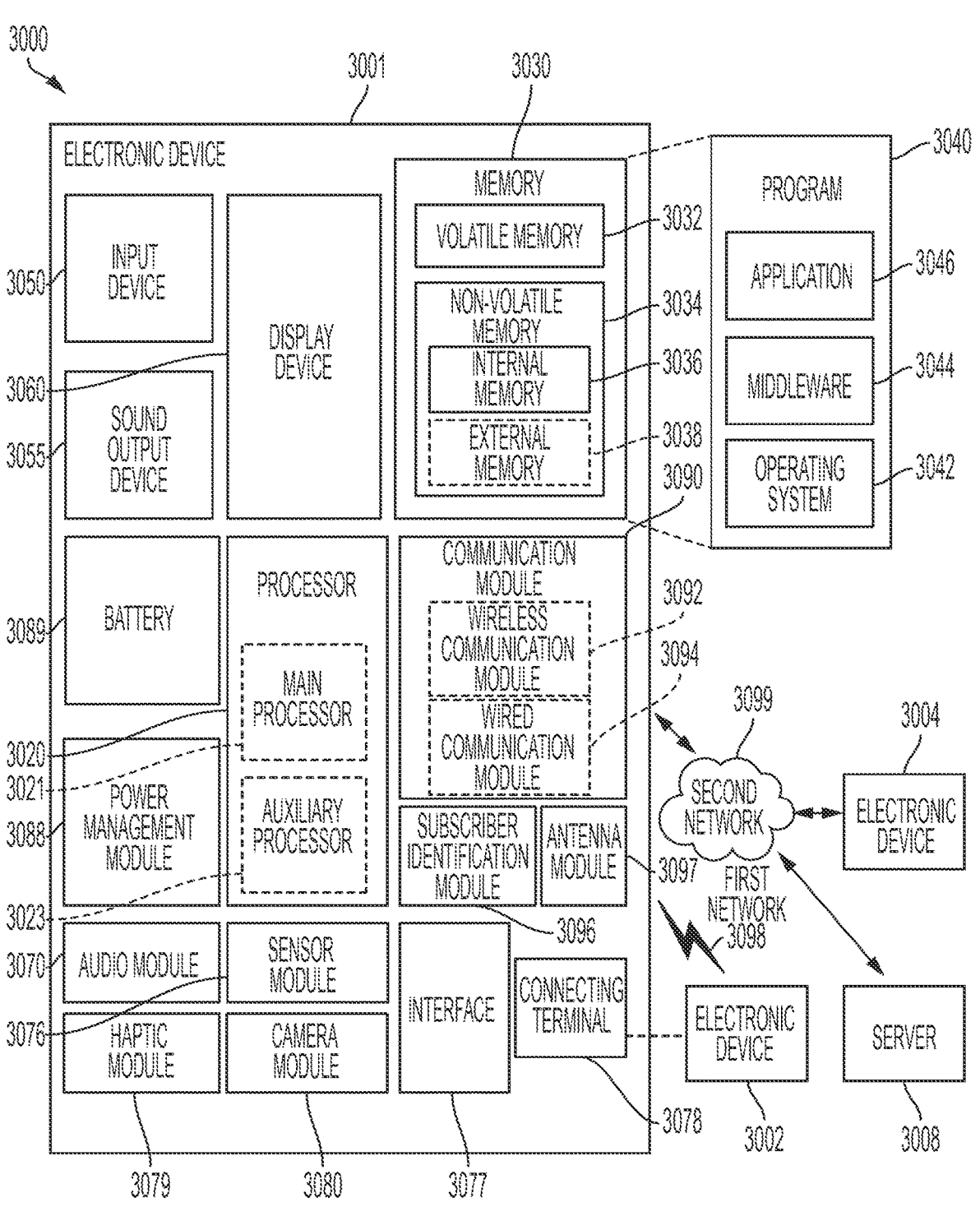
FIG. 30 is a block diagram of an electronic device in a network environment, according to an embodiment.

FIG. 30 is a block diagram of an electronic device in a network environment 3000, according to an embodiment. Referring to FIG. 30, an electronic device 3001 in a network environment 3000 may communicate with an electronic device 3002 via a first network 3098 (for example, a short-range wireless communication network, an unlicensed spectrum or sidelink communication, etc.), or an electronic device 3004 or a server 3008 via a second network 3099 (for example, a long-range wireless communication network). The electronic device 3001 may communicate with the electronic device 3004 via the server 3008. The electronic device 3001 may include a processor 3020, a memory 3030, an input device 3040, a sound output device 3055, a display device 3060, an audio module 3070, a sensor module 3076, an interface 3077, a haptic module 3079, a camera module 3080, a power management module 3088, a battery 3089, a communication module 3090, a subscriber identification module (SIM) card 3096, or an antenna module 3094. In one embodiment, at least one (for example, the display device 3060 or the camera module 3080) of the components may be omitted from the electronic device 3001, or one or more other components may be added to the electronic device 3001. Some of the components may be implemented as a single integrated circuit (IC). For example, the sensor module 3076 (for example, a fingerprint sensor, an iris sensor, or an illuminance sensor) may be embedded in the display device 3060 (for example, a display).

The processor 3020 may execute software (for example, a program 3040) to control at least one other component (for example, a hardware or a software component) of the electronic device 3001 coupled with the processor 3020 and may perform various data processing or computations. Any of the UEs as disclosed herein, may be presented by electronic device 3001. For example, each of the receiving UEs may have all or part of the parts in electronic device 3001. Similarly, the transmitting UE may have all or part of the parts as presented in electronic device 3001.

As at least part of the data processing or computations, the processor 3020 may load a command or data received from another component (for example, the sensor module 3046 or the communication module 3090) in volatile memory 3032, process the command or the data stored in the volatile memory 3032, and store resulting data in non-volatile memory 3034. The processor 3020 may include a main processor 3021 (for example, a central processing unit (CPU) or an application processor (AP)), and an auxiliary processor 3023 (for example, a graphics processing unit (GPU), an image signal processor (ISP), a sensor hub processor, or a communication processor (CP)) that is operable independently from, or in conjunction with, the main processor 3021. Additionally, or alternatively, the auxiliary processor 3023 may be adapted to consume less power than the main processor 3021, or execute a particular function. The auxiliary processor 3023 may be implemented as being separate from, or a part of, the main processor 3021.

The auxiliary processor 3023 may control at least some of the functions or states related to at least one component (for example, the display device 3060, the sensor module 3076, or the communication module 3090) among the components of the electronic device 3001, instead of the main processor 3021 while the main processor 3021 is in an inactive (for example, sleep) state, or together with the main processor 3021 while the main processor 3021 is in an active state (for example, executing an application). The auxiliary processor 3023 (for example, an image signal processor or a communication processor) may be implemented as part of another component (for example, the camera module 3080 or the communication module 3090) functionally related to the auxiliary processor 3023.

The memory 3030 may store various data used by at least one component (for example, the processor 3020 or the sensor module 3076) of the electronic device 3001. The various data may include, for example, software (for example, the program 3040) and input data or output data for a command related thereto. The memory 3030 may include the volatile memory 3032 or the non-volatile memory 3034.

The program 3040 may be stored in the memory 3030 as software, and may include, for example, an operating system (OS) 3042, middleware 3044, or an application 3046. All or parts of the methods described herein may be loaded as part of program 3040.

The input device 3050 may receive a command or data to be used by another component (for example, the processor 3020) of the electronic device 3001, from the outside (for example, a user) of the electronic device 3001. The input device 3050 may include, for example, a microphone, a mouse, or a keyboard.

The sound output device 3055 may output sound signals to the outside of the electronic device 3001. The sound output device 3055 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 3060 may visually provide information to the outside (for example, a user) of the electronic device 3001. The display device 3060 may include, for example, a display, a hologram device, or a projector and control circuitry to control a corresponding one of the display, hologram device, and projector. The display device 3060 may include touch circuitry adapted to detect a touch, or sensor circuitry (for example, a pressure sensor) adapted to measure the intensity of force incurred by the touch.

The audio module 3070 may convert a sound into an electrical signal and vice versa. The audio module 3070 may obtain the sound via the input device 3050 or output the sound via the sound output device 3055 or a headphone of an external electronic device 3002 directly (for example, wired) or wirelessly coupled with the electronic device 3001.

The sensor module 3076 may detect an operational state (for example, power or temperature) of the electronic device 3001 or an environmental state (for example, a state of a user) external to the electronic device 3001, and then generate an electrical signal or data value corresponding to the detected state. The sensor module 3076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 3077 may support one or more specified protocols to be used for the electronic device 3001 to be coupled with the external electronic device 3002 directly (for example, wired) or wirelessly. The interface 3077 may include, for example, a high-definition multimedia interface (HDMI), a universal serial bus (USB) interface, a secure digital (SD) card interface, or an audio interface.

A connecting terminal 3078 may include a connector via which the electronic device 3001 may be physically connected with the external electronic device 3002. The connecting terminal 3078 may include, for example, an HDMI connector, a USB connector, an SD card connector, or an audio connector (for example, a headphone connector).

The haptic module 3079 may convert an electrical signal into a mechanical stimulus (for example, a vibration or a movement) or an electrical stimulus which may be recognized by a user via tactile sensation or kinesthetic sensation. The haptic module 3079 may include, for example, a motor, a piezoelectric element, or an electrical stimulator.

The camera module 3080 may capture a still image or moving images. The camera module 3080 may include one or more lenses, image sensors, image signal processors, or flashes. The power management module 3088 may manage power supplied to the electronic device 3001. The power management module 3088 may be implemented as at least part of, for example, a power management integrated circuit (PMIC).

The battery 3089 may supply power to at least one component of the electronic device 3001. The battery 3089 may include, for example, a primary cell which is not rechargeable, a secondary cell which is rechargeable, or a fuel cell.

The communication module 3090 may support establishing a direct (for example, wired) communication channel or a wireless communication channel between the electronic device 3001 and the external electronic device (for example, the electronic device 3002, the electronic device 3004, or the server 3008) and performing communication via the established communication channel. The communication module 3090 may include one or more communication processors that are operable independently from the processor 3020 (for example, the AP) and supports a direct (for example, wired) communication or a wireless communication. The communication module 3090 may include a wireless communication module 3092 (for example, a cellular communication module, a short-range wireless communication module, or a global navigation satellite system (GNSS) communication module) or a wired communication module 3094 (for example, a local area network (LAN) communication module or a power line communication (PLC) module). A corresponding one of these communication modules may communicate with the external electronic device via the first network 3098 (for example, a short-range communication network, such as BLUETOOTH', wireless-fidelity (Wi-Fi) direct, or a standard of the Infrared Data Association (IrDA)) or the second network 3099 (for example, a long-range communication network, such as a cellular network, the Internet, or a computer network (for example, LAN or wide area network (WAN)). These various types of communication modules may be implemented as a single component (for example, a single IC), or may be implemented as multiple components (for example, multiple ICs) that are separate from each other. The wireless communication module 3092 may identify and authenticate the electronic device 3001 in a communication network, such as the first network 3098 or the second network 3099, using subscriber information (for example, international mobile subscriber identity (IMSI)) stored in the subscriber identification module 3096.

The antenna module 3097 may transmit or receive a signal or power to or from the outside (for example, the external electronic device) of the electronic device 3001. The antenna module 3097 may include one or more antennas, and, therefrom, at least one antenna appropriate for a communication scheme used in the communication network, such as the first network 3098 or the second network 3099, may be selected, for example, by the communication module 3090 (for example, the wireless communication module 3092). The signal or the power may then be transmitted or received between the communication module 3090 and the external electronic device via the selected at least one antenna.

Commands or data may be transmitted or received between the electronic device 3001 and the external electronic device 3004 via the server 3008 coupled with the second network 3099. Each of the electronic devices 3002 and 3004 may be a device of a same type as, or a different type, from the electronic device 3001. All or some of operations to be executed at the electronic device 3001 may be executed at one or more of the external electronic devices 3002, 3004, or 3008. For example, when the electronic device 3001 should perform a function or a service automatically, or in response to a request from a user or another device, the electronic device 3001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 3001. The electronic device 3001 may provide the outcome, with or without further processing of the outcome, as at least part of a reply to the request. To that end, a cloud computing, distributed computing, or client-server computing technology may be used, for example.

Figure 31:
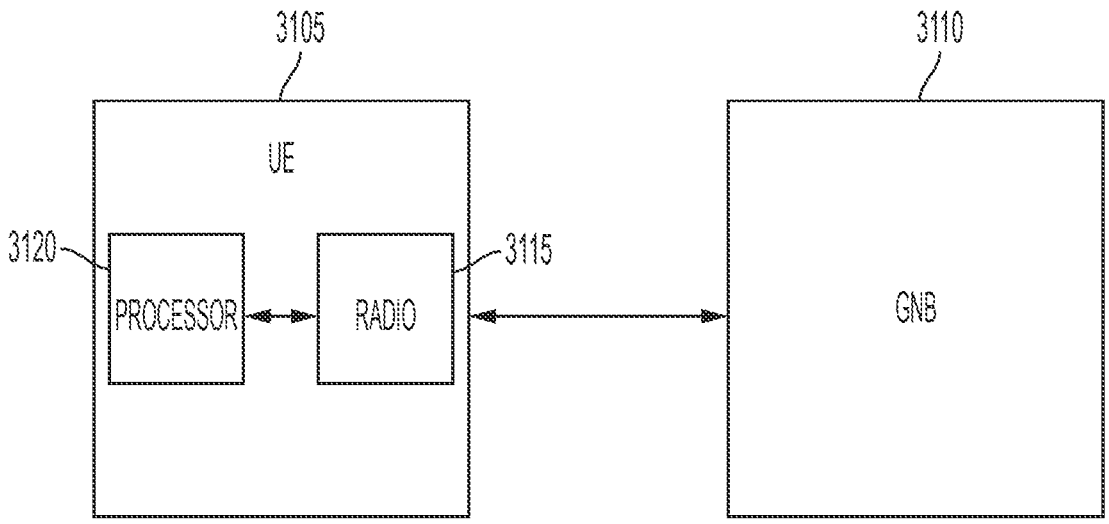
FIG. 31 shows a system including a UE and a gNB in communication with each other.

FIG. 31 shows a system including a UE 3105 and a gNB 3110, in communication with each other. The UE may include a radio 3115 and a processing circuit (or a means for processing) 3120, which may perform various methods disclosed herein, for example, the methods illustrated in FIG. 9, FIG. 12, FIG. 23, or FIG. 32. For example, the processing circuit 3120 may receive, via the radio 3115, transmissions from the network node (gNB) 3110, and the processing circuit 3120 may transmit, via the radio 3115, signals to the gNB 3110.

Figure 32:
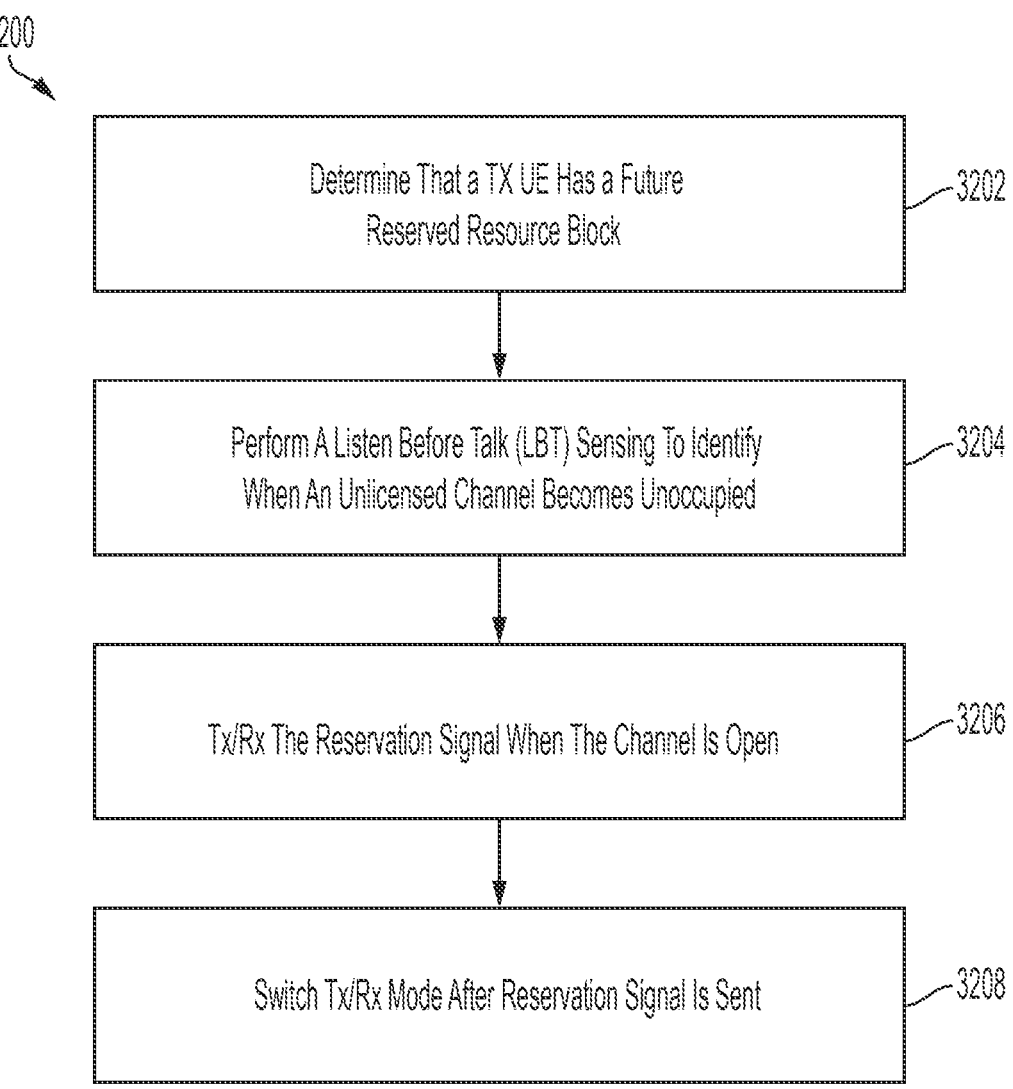
FIG. 32 illustrates an example embodiment of a method of reserving a timeslot by a Rx for a Tx, and decoding therein, in accordance with the disclosure.

FIG. 32 illustrates an example embodiment of a method 3200 of reserving a timeslot by a Rx for a Tx, and decoding therein, in accordance with the disclosure. One of the targeted Rx UEs disclosed herein, may determine that a corresponding transmitting UE has a future reserved resource block in block 3202.

In block 3204, the targeted receiving UE may perform an LBT sensing, to identify a time period when an unlicensed channel is unoccupied, and may be used by the corresponding transmitting UE for the future reserved sidelink transmission. In some embodiments, the Tx UE may perform the LBT sensing at the same time as the one or more Rx UEs. In other embodiments, the Tx UE may be blocked and the Rx UE(s) may perform the LBT sensing to reserve a channel for the Tx UE, as disclosed herein.

In block 3206 the targeted receiving UE may transmit a reservation signal for the unlicensed channel to the corresponding transmitting UE, during at least a portion of the time period when the unlicensed channel is unoccupied. During the time period which was identified as unoccupied, the targeted receiving UE may occupy the channel to send the reservation signal. In other words, the unclicensed channel would be unoccupied but for the transmission by the targeted receiving UE.

The reservation signal may indicate that a COT Sharing event is taking place. In transmitting the reservation signals, the Rx UE may indicate and notify the Tx UE that the channel is open and that it has been reserved for the Tx UE. In receiving the reservation signal, the Tx UE may decode the signal to understand that the channel is open. The reservation signal may be modified, according to any of the embodiments as described herein.

The reservation signal may be filled with control information. The reservation signal may be partially filled with one or more sets of control information. The reservation signal may have control information in all the subchannels. The reservation signal may be filled with control information. The reservation signal may also may partially filled with one or more sets of control information. The set of control information may be carried in a DMRS signal. The control information may also be carried by one or more ZC sequences. The set of control information may be in all reserved subchannels, according to some embodiments.

Multiple UE's may be synchronized to a synchronization reference UE where each perform LBT sensing, and reserve the channel on behalf of the synchronization reference UE. The reservation signal may have a duty cycle of less than 100%. The duty cycle may be 50%, for example.

In block 3208 a targeted Rx UE may switch to a receiving mode prior or at a reserved slot boundary of the future reserved resource block.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively, or additionally, the program instructions may be encoded on an artificially-generated propagated signal, for example, a machine-generated electrical, optical, or electromagnetic signal, which is generated to encode information for transmission to suitable receiver apparatus for execution by a data processing apparatus. A computer-storage medium may be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium may also be, or be included in, one or more separate physical components or media (for example, multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

APPENDIX A

List of abbreviations

| 3GPP | Third generation partnership project |
| 5GAA | 5G Automotive Association |
| ACK/NACK | Acknowledgement/Negative Acknowledgement |
| AGC | Automatic Gain Control |
| BWP | Bandwidth Part |
| CAPC | Channel Access Priority Class |
| CBR | Channel Busy Ratio |
| CE | Control Element |
| CG | Configured Grant |
| CP | Cyclic Prefix |
| COT | Channel Occupancy Time |
| CR | Channel Occupancy Ratio |
| CW | Contention Window |
| DC | Downlink Control Information |
| DFN | Direct Frame Number |

APPENDIX A-continued

List of abbreviations

| DL | Downlink |
| DMRS | Demodulation Reference Signal |
| DRX | Discontinuous reception |
| eNB | Evolved Node-B |
| FDD | Frequency Division Duplexing |
| gNB | Next Generation Node-B |
| GNSS | Global Navigation Satellite System |
| GP | Guard Period |
| ITS | Intelligent Transportation System |
| LBT | Listen Before Talk |
| MAC | Medium Access Control |
| NR-U | New Radio Unlicensed |
| OCB | Occupied Channel Bandwidth |
| OFDM | Orthogonal Frequency Division Multiplexing |
| PSCCH | Physical Sidelink Control Channel |
| PSFCH | Physical Sidelink Feedback Channel |
| PSSCH | Physical Sidelink Shared Channel |
| RB | Resource Block |
| RRC | Radio Resource Control |
| RSRP | Reference Signal Received Power |
| SCI | Sidelink Control Information |
| SSB | Synchronization Signal Block |
| TB | Transport Block |
| UE | User Equipment |
| UL | Uplink |
| V2X | Vehicle to Everything |
| WiFi | Wireless Fidelity |
| ZC | Zadoff-Chu |

What is claimed is:

1. A method comprising:

determining, by a targeted receiving User Equipment (UE), that a corresponding transmitting UE has a future reserved resource block;

performing, by the targeted receiving UE, a Listen Before Talk (LBT) sensing to identify a time period when an unlicensed channel is unoccupied, and can be used by the corresponding transmitting UE for the future reserved sidelink transmission;

transmitting a reservation signal for the unlicensed channel to the corresponding transmitting UE, during at least a portion of the time period when the unlicensed channel is unoccupied; and prior or at a reserved slot boundary of the future reserved resource block, switching, by the receiving UE, to a receiving mode.

2. The method of claim 1, wherein the reservation signal includes a set of control information with a Channel Occupancy Time (COT) sharing indication.

3. The method of claim 2, wherein a portion or the whole reservation signal carries the set of control information.

4. The method of claim 2, wherein the reservation signal has control information in a subset of the reserved channel based on a resource pool (pre)-configuration.

5. The method of claim 2, wherein the set of control information is carried in a Demodulation Reference Signal (DMRS) sequence.

6. The method of claim 2, wherein the set of control information is carried by one or more Zadoff-Chu (ZC) sequences.

7. The method of claim 2, wherein the reservation signal has the set of control information in all reserved subchannels.

8. The method of claim 1, wherein multiple UE's are synchronized to a synchronization reference UE wherein each of the synchronized UEs perform Listen Before Talk sensing and reserve the channel on behalf of the synchronization reference UE.

9. The method of claim 1, further comprising:

performing a sidelink transmission, by the corresponding transmitting UE, at the reserved slot boundary over the reserved resource block.

10. The method of claim 1, further comprising, a reservation signal with a duty cycle of less than 100%.

11. A method comprising:

creating a reservation for a resource block, by a transmitting User Equipment (UE);

receiving a reservation signal on the transmitting UE, transmitted by a receiving UE on an unlicensed channel; and decoding the reservation signal, by the transmitting UE, wherein the reservation signal was transmitted for the unlicensed channel to the transmitting UE, by the receiving UE, during at least a portion of a time period when the unlicensed channel is unoccupied; and wherein the receiving UE performed a Listen Before Talk sensing to identify the time period when the unlicensed channel was unoccupied, and the transmitting UE can use the future reserved resource block.

12. The method of claim 11, wherein the reservation signal includes a set of control information with a Channel Occupancy Time (COT) sharing indication.

13. The method of claim 12, wherein a portion or the whole reservation signal carries the set of control information.

14. The method of claim 12, wherein the reservation signal has control information in a subset of the reserved channel based on a resource pool (pre)-configuration.

15. The method of claim 12, wherein the set of control information is carried in a Demodulation Reference Signal (DMRS) sequence.

16. The method of claim 12, wherein the set of control information is carried by one or more Zadoff-Chu (ZC) sequences.

17. The method of claim 12, wherein the reservation signal has the set of control information in all reserved subchannels.

18. The method of claim 11, wherein multiple UE's are synchronized to a synchronization reference UE wherein each of the synchronized UEs perform Listen Before Talk sensing and reserve the channel on behalf of the synchronization reference UE.

19. A device comprising:

a transceiver; and a processor configured to:

determine, via the transceiver, that a corresponding transmitting User Equipment (UE) has a future reserved resource block;

perform, via the transceiver, a Listen Before Talk (LBT) sensing to identify a time period when an unlicensed channel is unoccupied, and can be used by the corresponding device for the future reserved sidelink transmission;

transmit a reservation signal for the unlicensed channel to the corresponding transmitting UE, during at least a portion of the time period when the unlicensed channel is unoccupied; and prior or at a reserved slot boundary of the future reserved resource block, switch, by the device, to a receiving mode.

20. The device of claim 19, wherein the reservation signal includes a set of control information with a Channel Occupancy Time (COT) sharing indication.

* * * * *